United States Patent
Noguchi

(10) Patent No.: US 10,848,326 B2
(45) Date of Patent: Nov. 24, 2020

(54) SYSTEM AND METHOD FOR COLLISION DETECTION

(71) Applicant: FUJITSU LIMITED, Kawasaki (JP)

(72) Inventor: Yasuo Noguchi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 359 days.

(21) Appl. No.: 15/990,865

(22) Filed: May 29, 2018

(65) Prior Publication Data

US 2019/0007222 A1   Jan. 3, 2019

(30) Foreign Application Priority Data

Jun. 30, 2017   (JP) .................... 2017-128334

(51) Int. Cl.
*H04L 9/32*  (2006.01)
*H04L 9/08*  (2006.01)

(52) U.S. Cl.
CPC .......... *H04L 9/3278* (2013.01); *H04L 9/0866* (2013.01); *H04L 9/3239* (2013.01); *H04L 2209/26* (2013.01); *H04L 2209/34* (2013.01)

(58) Field of Classification Search
CPC . H04L 9/3278; H04L 2209/26; H04L 9/3239; H04L 9/0866; H04L 2209/34
See application file for complete search history.

(56) References Cited

U.S. PATENT DOCUMENTS

| 8,868,923 B1* | 10/2014 | Hamlet .................. H04N 1/442 713/186 |
| 2010/0031065 A1* | 2/2010 | Futa ...................... H04L 9/0866 713/194 |
| 2014/0089685 A1 | 3/2014 | Suzuki |
| 2015/0086016 A1 | 3/2015 | Oshida et al. |

(Continued)

FOREIGN PATENT DOCUMENTS

| JP | 2015-065495 | 4/2015 |
| WO | 2012/164721 | 12/2012 |

OTHER PUBLICATIONS

Ari Juels et al., "A Fuzzy Commitment Scheme", Proceedings of the 6th ACM conference on Computer and Communications Security (CCS '99), Nov. 1-4, 1999, pp. 28-36 (9 pages).

*Primary Examiner* — Tongoc Tran
(74) *Attorney, Agent, or Firm* — Fujitsu Patent Center

(57) ABSTRACT

An inspection target apparatus includes a generating circuit and a processing unit. The generating circuit generates a value depending on hardware. The processing unit generates, in response to a first request, encoding result data using the generated value and an error-correction encoding method and outputs the encoding result data. The processing unit generates, in response to a second request, decoding result data using designated encoding result data, the generated value, and an error-correction decoding method and outputs the decoding result data. An inspection apparatus includes a storing unit and a processing unit. The storing unit (Continued)

stores encoding result data generated by a different inspection target apparatus and reference data. The processing unit designates encoding result and receives decoding result data from the inspection target apparatus. The processing unit determines whether the decoding result data matches the reference data in comparison with each other.

9 Claims, 28 Drawing Sheets

(56) References Cited

U.S. PATENT DOCUMENTS

| | | | |
|---|---|---|---|
| 2015/0188707 A1* | 7/2015 | Gehrer | H04L 9/3006 |
| | | | 380/30 |
| 2015/0295722 A1* | 10/2015 | Falk | H04L 9/3278 |
| | | | 380/44 |
| 2016/0149702 A1* | 5/2016 | Fischer | H04L 9/0866 |
| | | | 380/44 |
| 2017/0237573 A1* | 8/2017 | Goettfert | G06F 21/72 |
| | | | 713/193 |
| 2017/0257222 A1* | 9/2017 | Pedersen | G06F 3/0679 |
| 2019/0026724 A1* | 1/2019 | Wade | G07F 7/0873 |
| 2019/0028283 A1* | 1/2019 | Sharifi | G06Q 20/3829 |
| 2019/0028284 A1* | 1/2019 | Rezayee | H04L 9/004 |
| 2019/0342090 A1* | 11/2019 | Pisasale | H04L 9/0894 |
| 2019/0342105 A1* | 11/2019 | Adams | H04L 9/3278 |
| 2020/0169423 A1* | 5/2020 | Cambou | H04L 9/3278 |

* cited by examiner

FIG. 27

PUBLIC DATABASE

EXISTING DATA TABLE

| PUF DEVICE ID | EXISTING AUXILIARY DATA | EXISTING HASH |
|---|---|---|
| puf#1 | aux#1 | hash#1 |
| puf#2 | aux#2 | hash#2 |
| ... | ... | ... |

SYSTEM AND METHOD FOR COLLISION DETECTION

CROSS-REFERENCE TO RELATED APPLICATION

This application is based upon and claims the benefit of priority of the prior Japanese Patent Application No. 2017-128334, filed on Jun. 30, 2017, the entire contents of which are incorporated herein by reference.

FIELD

The embodiments discussed herein are related to a system and method for collision detection.

BACKGROUND

Cryptographic processing technologies are in use today to provide data protection and user authentication to thereby enhance information security. Some cryptographic processing technologies currently proposed employ physical unclonable functions (PUFs). PUFs are functions that output identifiers (PUF values) depending on physical features such as impurity concentration. Differences in PUF values are based on individual differences inevitably occurring during manufacture of PUF circuits for generating the PUF values, and it is difficult to intentionally manufacture a plurality of PUF circuits that generate identical PUF values. As a result, PUFs have duplication difficulty and thus make each PUF value an identifier with high discriminability.

Note however that a plurality of PUF values generated by the same PUF circuit at different timings do not differ substantially but not necessarily match exactly. For example, depending on the usage conditions such as ambient temperature, some fluctuation may be seen in PUF values generated by the same PUF circuit. In view of this, it has been proposed to absorb the fluctuation in the PUF values using an error correction technique.

A security apparatus for protecting confidential information using PUF technology, for example, has been proposed. The proposed security apparatus generates a PUF value "x" using a PUF circuit, generates key information "k" from the PUF value "x", and encrypts confidential information using the key information "k" to thereby generate encrypted confidential information. The security apparatus then generates auxiliary data "a" corresponding to the PUF value "x" and a hash "h" of the key information "k" and stores the encrypted confidential information, the auxiliary data "a", and the hash "h" in a non-volatile memory.

In using the confidential information, the security apparatus generates a PUF value "x'" using the same PUF circuit above, then generates a PUF value "x''" by error-correcting the PUF value "x'" using the stored auxiliary data "a", and generates key information "k''" from the PUF value "x''". The security apparatus generates a hash "h''" of the key information "k''", and then compares the hash "h''" against the stored hash "h". If h''=h, the security apparatus decrypts the encrypted confidential information using the key information "k''".

If h''≠h, the security apparatus regenerates the PUF value "x'" using the same PUF circuit above and then regenerates the key information "k''".

An encryption key supplying method for protecting an encryption key using PUF technology, for example, has also been proposed. In the proposed encryption key supplying method, a client generates a PUF value and sends it to a server. The server then generates, based on the PUF value, a device unique identifier (ID) corresponding to the client and helper data used to correct PUF-value fluctuation, and generates a hash function using the device unique ID and an encryption key. The server sends the helper data and the hash function to the client, and the client then restores the encryption key using the helper data, the hash function, and a newly generated PUF value.

See, for example, International Publication Pamphlet No. WO 2012/164721 and Japanese Laid-open Patent Publication No. 2015-65495.

Because of the duplication difficulty of PUFs, there is a low probability that different PUF circuits generate identical or approximate PUF values. Although having said that, the probability being zero is not guaranteed, remaining risk of accidental PUF value collisions between different PUF circuits. Such PUF value collisions may result in reducing information security. Therefore, it is in some cases desired to make sure that there are no PUF value collisions among a plurality of security devices using PUFs. However, in terms of protecting PUF values, it is sometimes difficult to directly retrieve the PUF values from outside the security devices after manufacture. Thus, there remains the problem of how to detect PUF value collisions.

SUMMARY

According to an aspect, there is provided a collision detection system including: an inspection target apparatus configured to include a generating circuit configured to generate a value depending on hardware, and a first processing unit configured to execute a first process including outputting encoding result data by generating, in response to a first request, the encoding result data using the generated value and an error-correction encoding method and outputting decoding result data by generating, in response to a second request including designation of encoding result data, the decoding result data using the designated encoding result data, the generated value, and an error-correction decoding method; and an inspection apparatus configured to include a storing unit configured to store first encoding result data generated by a different inspection target apparatus and reference data, and a second processing unit configured to execute a second process including indicating designation of the first encoding result data to the inspection target apparatus, receiving first decoding result data corresponding to the first encoding result data from the inspection target apparatus, and determining whether the first decoding result data matches the reference data in comparison with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 27 illustrates an example of a public table according to the seventh embodiment.

DESCRIPTION OF EMBODIMENTS

Figure 1:
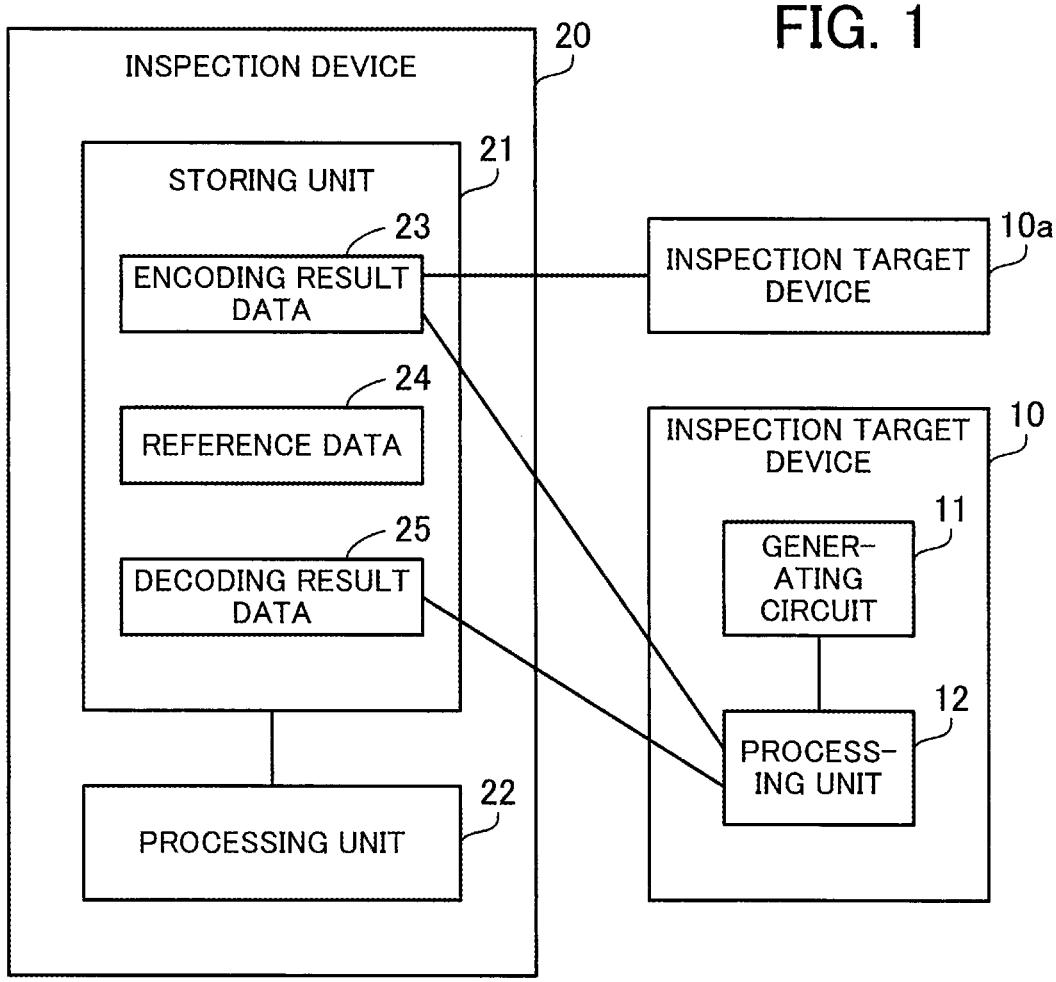
FIG. 1 illustrates an example of a collision detection system according to a first embodiment.

Several embodiments will be described below with reference to the accompanying drawings, wherein like reference numerals refer to like elements throughout.

(a) First Embodiment

Next described is a first embodiment. FIG. 1 illustrates an example of a collision detection system according to the first embodiment. The collision detection system according to the first embodiment includes an inspection target device 10 and an inspection device 20. The inspection target device 10 is a hardware security device used for cryptographic processing associated with, for example, data protection and user authentication. The inspection device 20 is a computer for inspecting security of the inspection target device 10, for example, prior to the use of the inspection target device 10. The inspection device 20 may be a client computer or a server computer. The inspection target device 10 is connected to the inspection device 20. The inspection target device 10 may be built into the inspection device 20.

The inspection target device 10 includes a generating circuit 11 and a processing unit 12. One or both of the generating circuit 11 and the processing unit 12 may be implemented using a programmable device with a logic circuit reconfigurable after the manufacture, such as a field programmable gate array (FPGA). Alternatively, one or both of the generating circuit 11 and the processing unit 12 may be implemented using a dedicated circuit designed for specific use, such as an application specific integrated circuit (ASIC).

The generating circuit 11 generates a value depending on the hardware of the generating circuit 11. The value generated by the generating circuit 11 is sometimes referred to as "PUF value". Each generated value depends on an individual difference associated with a physical feature, such as impurity concentration, inevitably occurring during the manufacture. Differences in generated values arise from, for example, subtle differences in the timing of changes in an output signal in accordance with changes in an input signal or differences in an initial value of memory obtained immediately after a power-on. A plurality of values generated by the generating circuit 11 at different timings approximate each other but not necessarily match exactly and sometimes fluctuate within a certain range. In addition, there is a low probability that the generating circuit 11 generates identical or approximate values to those generated by other generating circuits of the same type. Note however that the probability is not zero due to possible manufacturing contingencies.

The processing unit 12 performs an encoding process described below in response to a first request received from outside the inspection target device 10. The processing unit 12 also performs a decoding process described below in response to a second request received from outside the inspection target device 10. In the encoding process, the processing unit 12 retrieves, from the generating circuit 11, a value generated by the generating circuit 11. The processing unit 12 generates encoding result data using the retrieved value and a predetermined error-correction encoding method, and outputs the encoding result data outside the inspection target device 10. In this regard, the processing unit 12 need not output the value retrieved from the generating circuit 11 externally from the inspection target device 10.

For example, the processing unit 12 generates an error correction code used to correct, to the value retrieved from the generating circuit 11, a different value approximating the retrieved value, and then outputs the error correction code as the encoding result data. Alternatively, for example, the processing unit 12 encrypts plain text designated in the first request and then outputs the encrypted text as the encoding result data. Yet alternatively, for example, the processing unit 12 encrypts a cryptographic key designated in the first request to generate a concealed cryptographic key and then outputs the thus encrypted concealed cryptographic key as the encoding result data.

In the decoding process, the processing unit 12 retrieves anew, from the generating circuit 11, a value generated by the generating circuit 11. The processing unit 12 generates decoding result data using the retrieved value, a predetermined error-correction decoding method corresponding to the aforementioned error-correction encoding method, and encoding result data designated in the second request, and then outputs the decoding result data outside the inspection target device 10. In this regard, the processing unit 12 need not output the value retrieved from the generating circuit 11 externally from the inspection target device 10.

For example, the processing unit 12 error-corrects the value retrieved from the generating circuit 11 to thereby calculate a corrected value, and outputs a hash of the corrected value as the decoding result data. Alternatively, for example, the processing unit 12 decrypts encrypted text designated in the second request, and then outputs the decrypted plain text as the decoding result data. Yet alternatively, for example, the processing unit 12 decrypts a concealed cryptographic key designated in the second request to extract a cryptographic key, then decrypts encrypted text designated in the second request using the extracted cryptographic key to thereby output the decrypted plain text as the decoding result data.

The inspection device 20 includes a storing unit 21 and a processing unit 22. The storing unit 21 may be a volatile semiconductor memory such as a random access memory (RAM), or a non-volatile storage device such as a hard disk drive (HDD) and a flash memory. The processing unit 22 is, for example, a processor such as a central processing unit (CPU) and a digital signal processor (DSP). Note however that the processing unit 22 may include a dedicated circuit designed for specific use, for example, an ASIC or a FPGA. The processor executes programs stored in a memory such as a RAM or in the storing unit 21, for example. The programs include a collision detection program. The term "multiprocessor", or simply "processor", is sometimes used here to refer to a set of multiple processors.

The storing unit 21 stores therein encoding result data 23 generated by an inspection target device 10a which is different from the inspection target device 10. For example, the encoding result data 23 is generated by the inspection target device 10a in an encoding process similar to the encoding process performed by the processing unit 12 above and then sent from the inspection target device 10a to the inspection device 20. To generate the encoding result data 23, a value generated by a generating circuit of the inspection target device 10a is used, for example. The difference between the value generated by the generating circuit 11 of the inspection target device 10 and the value generated by the generating circuit of the inspection target device 10a may be minor (which corresponds to correctable noise) in some cases and considerable (which corresponds to uncorrectable noise) in other cases for the error-correction decoding method above.

The storing unit 21 also stores therein reference data 24. The reference data 24 is data used for inspection of the inspection target device 10. The reference data 24 is, for example, a hash generated by the inspection target device 10a in a decoding process similar to the decoding process performed by the processing unit above. Alternatively, the reference data 24 is, for example, original plain text used when the inspection target device 10a generated encrypted text as the encoding result data 23. Yet alternatively, the reference data 24 is, for example, original plain text corresponding to encrypted text to be input to the inspection target device 10.

The processing unit 22 inspects the inspection target device 10 using the encoding result data 23 and the reference data 24. The processing unit 22 transmits the second request with designation of the encoding result data 23, and then receives decoding result data 25 from the inspection target device 10 as a response to the second request. The processing unit 22 compares the reference data 24 to the decoding result data 25 to determine whether to agree or disagree. If the reference data 24 matches the decoding result data 25, the processing unit 22 determines, for example, that there is a collision of the generated values between the generating circuit 11 of the inspection target device 10 and the generating circuit of the inspection target device 10a. In that case, it is preferable to avoid the use of the inspection target device 10 or prevent the collision by changing the configuration of the inspection target device 10. On the other hand, if the reference data 24 and the decoding result data 25 do not match each other, the processing unit 22 determines, for example, that there is no collision of the generated values between the generating circuit 11 of the inspection target device 10 and the generating circuit of the inspection target device 10a.

In this regard, for example, the processing unit 22 transmits, as the encoding result data 23, an error correction code generated by the inspection target device 10a to the inspection target device 10 and receives, as the decoding result data 25, a hash generated by the inspection target device 10. Then, the processing unit 22 compares the received hash to a hash generated by the inspection target device 10a as the reference data 24. Alternatively, for example, the processing unit 22 transmits, as the encoding result data 23, encrypted text generated by the inspection target device 10a to the inspection target device 10 and receives, as the decoding result data 25, plain text decrypted by the inspection target device 10. The processing unit 22 compares the received plain text to plain text serving as the reference data 24. Yet alternatively, for example, the processing unit 22 transmits, as the encoding result data 23, a concealed cryptographic key and encrypted text generated by the inspection target device 10a to the inspection target device 10 and receives, as the decoding result data 25, plain text decrypted by the inspection target device 10. The processing unit 22 compares the received plain text to plain text serving as the reference data 24.

The collision detection system according to the first embodiment is able to detect, from outside a plurality of inspection target devices, collisions among values of generating circuits used inside those inspection target devices. This allows the implementation of measures, for example, avoiding the use of inspection target devices with collisions, thus enhancing information security. In addition, the collision detection system allows collision detection without acquiring the values of the generating circuits from the inspection target devices, which eliminates the need to provide each inspection target device with an interface for outputting the value of its generating circuit. This in turn improves the security of the inspection target devices. Further, with the use of an error correction technique, it is possible to detect that generating circuits of different inspection target devices generate approximate values, which allows absorption of fluctuation in the generated values.

(b) Second Embodiment

Figure 2:
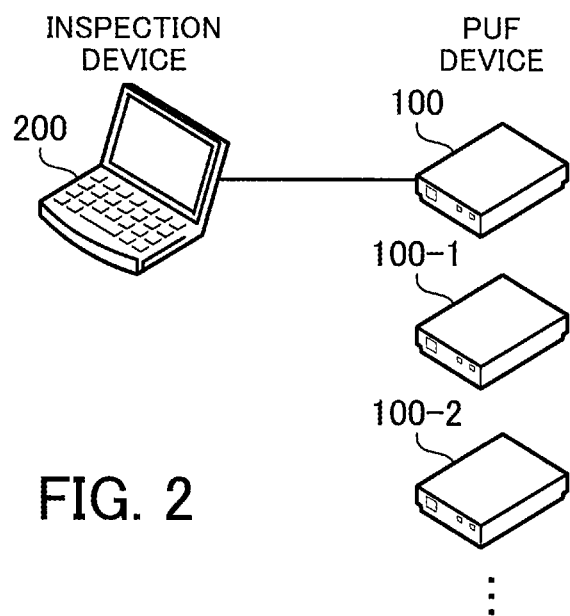
FIG. 2 illustrates an example of an information processing system according to a second embodiment.

Next described is a second embodiment. FIG. 2 illustrates an example of an information processing system according to the second embodiment. The information processing system according to the second embodiment inspects a plurality of PUF devices. The information processing system comprises a plurality of PUF devices including PUF devices 100, 100-1, and 100-2, and an inspection device 200. Each of the PUF devices is a hardware security device for safely performing cryptographic processing associated with, for example, data protection and user authentication. The inspection device 200 is a computer to be connected to each of the PUF devices for inspection. The inspection device 200 may be a client computer or a server computer.

Inspection of the PUF devices is performed, for example by a manufacturer producing the PUF devices before shipment. Note however that a vender who procures the PUF devices and provides electronic devices incorporating the PUF devices may carry out inspection of the PUF devices. In addition, a user of each PUF device or an electronic device incorporating the PUF device, or other third party, may carry out inspection of the PUF device. Note that in the case where electronic devices incorporating PUF devices (for example, server devices equipped with PUF devices) are to be shipped, inspection of the PUF devices may be performed after the PUF devices are incorporated into the electronic devices. In that case, each of the electronic devices may be connected to the inspection device 200 via a network. Instead, each electronic device may be provided with inspection functions of the inspection device 200, described below.

Figure 3:
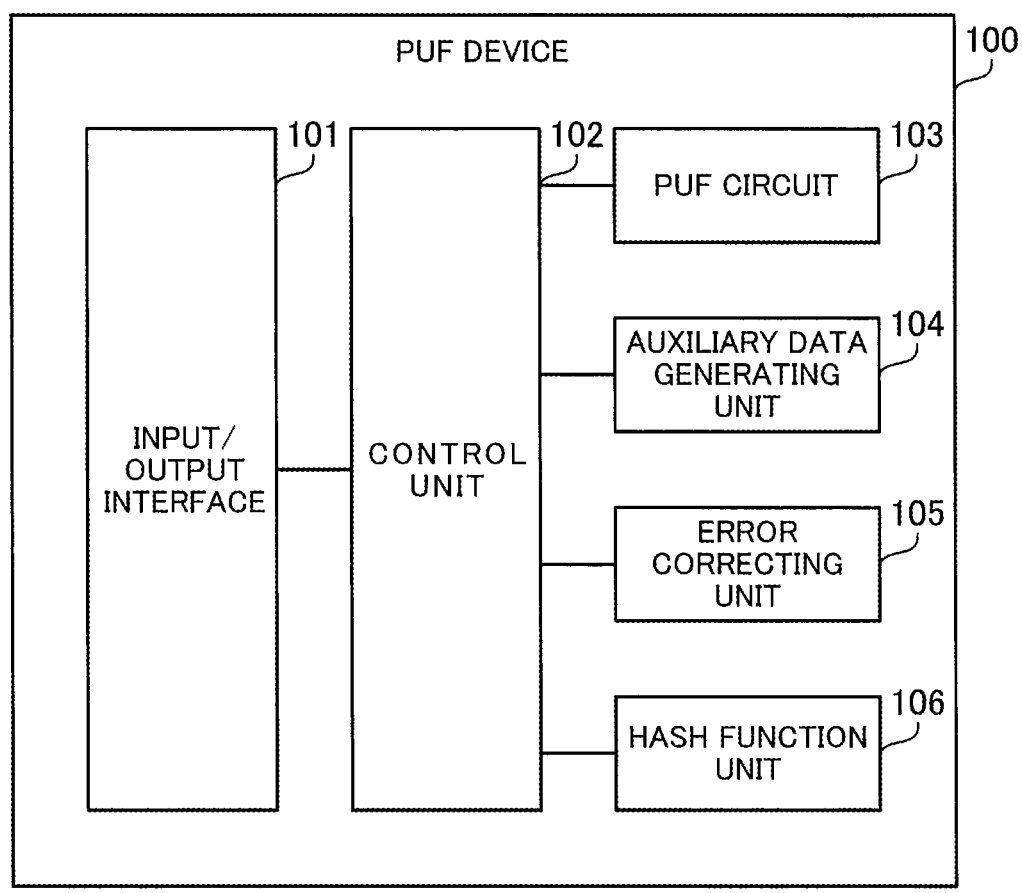
FIG. 3 is a block diagram illustrating an example of a PUF device according to the second embodiment.

FIG. 3 is a block diagram illustrating an example of a PUF device according to the second embodiment. The PUF device 100 includes an input/output interface 101, a control unit 102, a PUF circuit 103, an auxiliary data generating unit 104, an error correcting unit 105, and a hash function unit 106. A part of or the entire PUF device 100 may be implemented using a programmable device such as an FPGA. Alternatively, a part of or the entire PUF device 100 may be implemented using an ASIC which is a dedicated circuit. The remaining PUF devices, including the PUF devices 100-1 and 100-2, may be implemented using the same hardware constructions as that of the PUF device 100.

The input/output interface 101 is an interface for receiving a command from the inspection device 200 and then outputting the result obtained by executing the command to the inspection device 200. Auxiliary data acquisition commands and hash acquisition commands are the types of commands used in the second embodiment. In response to an auxiliary data acquisition command, auxiliary data generated by the PUF device 100 is output. A hash acquisition command is accompanied by auxiliary data generated in advance. In response to the hash acquisition command, a hash generated by the PUF device 100 is output. To generate the auxiliary data and the hash, a PUF value generated inside the PUF device 100 is used; however, the PUF value itself is not output externally from the PUF device 100.

The control unit 102 obtains a command from the input/output interface 101, then performs cryptographic processing using the PUF circuit 103, the auxiliary data generating unit 104, the error correcting unit 105, and the hash function unit 106, and outputs the result of the cryptographic processing to the input/output interface 101. In response to an auxiliary data acquisition command, the control unit 102 retrieves a PUF value from the PUF circuit 103, and inputs the retrieved PUF value to the auxiliary data generating unit 104 to thereby acquire auxiliary data from the auxiliary data generating unit 104. In response to a hash acquisition command, the control unit 102 retrieves a PUF value from the PUF circuit 103, and inputs the retrieved PUF value and auxiliary data attached to the hash acquisition command into the error correcting unit 105 to thereby acquire a corrected PUF value from the error correcting unit 105. Subsequently, the control unit 102 inputs the corrected PUF value into the hash function unit 106 to thereby acquire a hash from the hash function unit 106.

The PUF circuit 103 is an electronic circuit for generating PUF values unique to its hardware using PUF technology. The PUF values depend on individual difference associated with hardware, such as impurity concentration, inevitably occurring during the manufacture. The PUF values are difficult to retrieve directly from outside the PUF device 100, and thus ensure low leakage risk and are therefore physically protected. Duplication difficulty of the PUF values reinforces cryptographic processing associated with, for example, data protection and user authentication.

PUF values have the following attributes. That is, PUF values generated by the PUF circuit 103 at different timings do not differ substantially but not always take the same value and sometimes fluctuate within a certain range depending on, for example, the use environment of the PUF device 100. The variations in the PUF values appear in a sufficiently small number of bits compared to the length of each PUF value (the total bit number). There is a sufficiently low probability that the PUF circuit 103 generates identical or sufficiently approximate values to those generated by other PUF circuits (i.e., a sufficiently low probability of occurrence of PUF value collisions). Note however that the probability of occurrence of PUF value collisions among a plurality of PUF circuits is not zero due to possible manufacturing contingencies. In view of this, the inspection of PUF devices according to the second embodiment is directed to inspecting PUF value collisions.

The auxiliary data generating unit 104 obtains a PUF value from the control unit 102, and generates auxiliary data corresponding to the obtained PUF value and then outputs the auxiliary data to the control unit 102. The auxiliary data is an accompanying bit string generated for the PUF value using an error correction technique, and is used to correct PUF value fluctuation. According to the second embodiment, the PUF value fluctuation is considered as noise added to a reference PUF value. The PUF value input to the auxiliary data generating unit 104 to generate the auxiliary data is used as the reference PUF value. It is possible to convert, using the auxiliary data, other PUF values within an error-correctable range from the reference PUF value (i.e., other PUF values whose Hamming distance from the reference PUF value is less than or equal to a correctable bit count) to the reference PUF value.

The error correcting unit 105 obtains a PUF value and auxiliary data from the control unit 102, and performs an error correction process on the PUF value using the obtained auxiliary data to generate an error-corrected PUF value, which is then output to the control unit 102. If the PUF value input to the error correcting unit 105 sufficiently approximates the reference PUF value used to generate the auxiliary data, i.e., if the Hamming distance between them is less than or equal to the correctable bit count, the error correction is done successfully and the corrected PUF value therefore matches the reference PUF value. On the other hand, if the Hamming distance between them exceeds the correctable bit count, the error correction fails and the corrected PUF value therefore does not match the reference PUF value.

Procedures for generating and using the auxiliary data depend on an adopted error correction technique. International Publication Pamphlet No. WO 2012/164721 also describes the procedures for generating and using the auxiliary data. Next described is one example of the procedures for generating and using the auxiliary data.

Assume that the PUF circuit 103 generates a PUF value "x", x=(x1, x2, x3, x4, x5)=10110, and the PUF value "x" is input to the auxiliary data generating unit 104. The auxiliary data generating unit 104 generates, for the PUF value "x", auxiliary data "ax", ax=(x1+x2, x1+x3, x1+x4, x1+x5)=1001. Note here that each additional symbol "+" represents a bitwise exclusive OR operation. Assume that the PUF circuit 103 subsequently generates a PUF value "y", y=(y1, y2, y3, y4, y5)=10000, and the PUF value "y" and the above auxiliary data "ax" are input to the error correcting unit 105. The error correcting unit 105 generates, for the PUF value auxiliary data "ay", ay=(y1+y2, y1+y3, y1+y4, y1+y5)=1111. The error correcting unit 105 compares the auxiliary data "ax" to the auxiliary data "ay" to thereby calculate an error value "e", e=ax+ay=(e1, e2, e3, e4)=0110.

The error correcting unit 105 detects error bits in the PUF value "y" based on the error value "e". Assume here that SUM(e) represents the count of bits that are "1" in the error value "e" and SL(e)=(e1+e2, e1+e3, e1+e4, e1). The error correcting unit 105 compares SUM(e) to a threshold Th (Th=3), and determines that no error has occurred in y1 because SUM(e) being 2 is less than the threshold Th. Next, the error correcting unit 105 updates the error value "e" to SL(e)=1100, and then determines that no error has occurred in y2 because SUM(e) being 2 is less than the threshold Th. Then, the error correcting unit 105 updates the error value "e" to SL(e)=0111, and determines that an error has occurred in y3 because SUM(e) being 3 is more than or equal to the threshold Th.

Next, the error correcting unit 105 updates the error value "e" to SL(e)=1110, and then determines that an error has occurred in y4 because SUM(e) being 3 is more than or equal to the threshold Th. Then, the error correcting unit 105 updates the error value "e" to SL(e)=0011, and determines that no error has occurred in y5 because SUM(e) being 2 is less than the threshold Th. After having repeated the comparison of SUM(e) to the threshold Th as many times as the bit count of the PUF value the error correcting unit 105 ends the determination process. In this manner, it is determined that errors have occurred in y3 and y4 of the PUF value "y". The error correcting unit 105 converts the PUF value y=10000 to a corrected PUF value y'=10110, which is equal to the PUF value "x" (i.e., y'=10110=x).

The hash function unit 106 obtains the corrected PUF value from the control unit 102, calculates a hash of the corrected PUF value using a predetermined hash function, and outputs the hash to the control unit 102. It is difficult to deduce the original corrected PUF value from the hash. The hash function unit 106 uses, for example, a hash function called Secure Hash Algorithm (SHA) 256.

Figure 4:
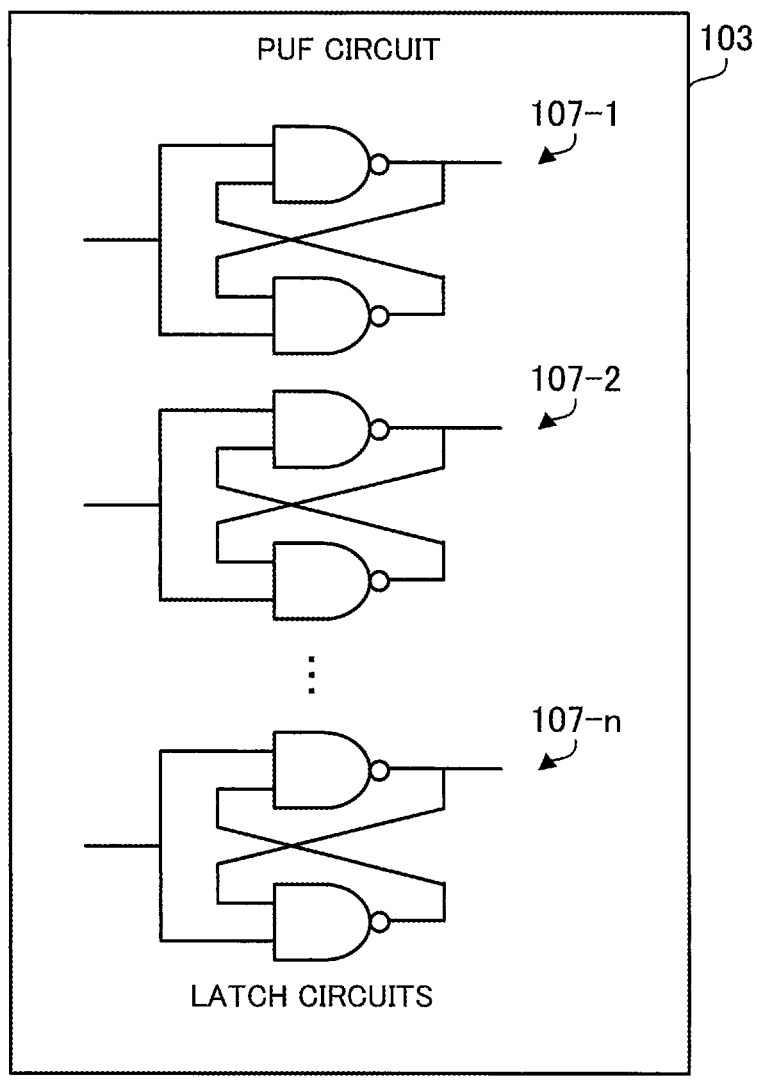
FIG. 4 illustrates an example of a PUF circuit according to the second embodiment.

FIG. 4 illustrates an example of a PUF circuit according to the second embodiment. Using latch circuits is one conceivable way of implementing the PUF circuit 103. As an example, the PUF circuit 103 includes "n" latch circuits 107-1, 107-2, . . . , 107-n ("n" is a natural number representing the bit count of a PUF value to be generated). The "n" latch circuits correspond to "n" bits making up the PUF value. The latch circuit 107-1 outputs a value of the least significant bit of the PUF value. The latch circuit 107-2 outputs a value of the second least significant bit of the PUF value. The latch circuit 107-n outputs a value of the most significant bit of the PUF value.

The latch circuits 107-1, 107-2, . . . , 107-n have the same architecture. Each latch circuit includes two NAND circuits (a first and a second NAND circuit). The first NAND circuit includes a first input terminal to which an input signal is supplied from outside the latch circuit; and a second input terminal to which an output signal of the second NAND circuit is fed back. The first NAND circuit also has an output terminal from which an output signal is delivered. The output signal of the first NAND circuit serves as an output signal sent outside the latch circuit. The second NAND circuit includes a first input terminal to which the same input signal supplied to the first NAND circuit from outside the latch circuit is supplied; and a second input terminal to which an output signal of the first NAND circuit is fed back. The second NAND circuit also has an output terminal from which an output signal is delivered.

When a predetermined input value (for example, "1") is input to the above-described latch circuits 107-1, 107-2, . . . , 107-n, an output value of each latch circuit is, theoretically speaking, not set. However, each latch circuit has a tendency to output a particular output value (a tendency to output "1" or "0"), arising from a physical feature of the latch circuit such as impurity concentration. Therefore, the n-bit PUF value generated using the latch circuits 107-1, 107-2, . . . , 107-n basically takes a value unique to the PUF circuit 103. Note however that the output value of each latch circuit is not set in theory, and it is not guaranteed that the same value is always output. As a result, PUF values output from the PUF circuit 103 do not greatly change but may fluctuate within a certain range.

Figure 5:
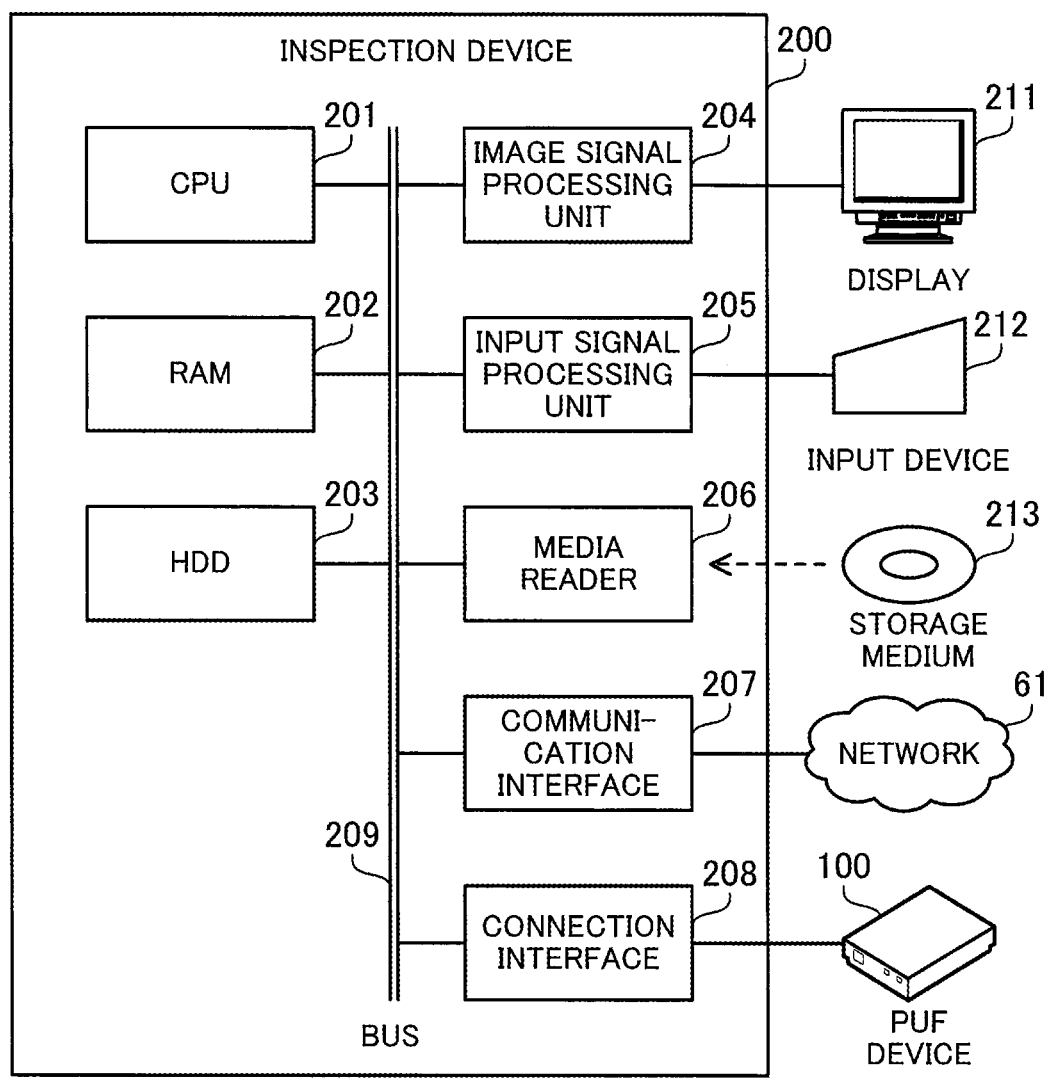
FIG. 5 is a block diagram illustrating an example of hardware of an inspection device according to the second embodiment.

FIG. 5 is a block diagram illustrating an example of hardware of an inspection device according to the second embodiment. The inspection device 200 includes a CPU 201, a RAM 202, a HDD 203, an image signal processing unit 204, an input signal processing unit 205, a media reader 206, a communication interface 207, and a connection interface 208. These units are individually connected to a bus 209.

The CPU 201 is a processor including a computing circuit for carrying out program instructions. The CPU 201 loads at least part of a program and data stored in the HDD 203 into the RAM 202 to execute the program. Note that the CPU 201 may include a plurality of processor cores and the inspection device 200 may include a plurality of processors, and processes to be described below may be executed in parallel using the plurality of processors or processor cores. The term "multiprocessor", or simply "processor" is sometimes used to refer to a set of multiple processors.

The RAM 202 is a volatile semiconductor memory for temporarily storing therein programs to be executed by the CPU 201 and data to be used by the CPU 201 for its computation. Note that the inspection device 200 may be provided with a different type of memory other than RAM, or may be provided with a plurality of memory devices. The HDD 203 is a non-volatile storage device to store therein software programs, such as an operating system (OS) and application software, and various types of data. Note that the inspection device 200 may be provided with a different type of storage device, such as a flash memory and a solid state drive (SSD), or may be provided with a plurality of non-volatile storage devices.

The image signal processing unit 204 outputs an image on a display 211 connected to the inspection device 200 according to an instruction from the CPU 201. The display 211 may be any type of display, such as a cathode ray tube (CRT) display, a liquid crystal display (LCD), a plasma display, and an organic electro-luminescence (OEL) display.

The input signal processing unit 205 acquires an input signal from an input device 212 connected to the inspection device 200 and sends the input signal to the CPU 201. Various types of input devices including the following may be used as the input device 212: a pointing device, such as a mouse, touch panel, touch-pad, and trackball; a keyboard; a remote controller; and a button switch. In addition, the inspection device 200 may be provided with a plurality of types of input devices.

The media reader 206 is a reader for reading programs and data recorded in a storage medium 213. As the storage medium 213, any of the following may be used: a magnetic disk, an optical disk, a magneto-optical disk (MO), and a semiconductor memory. Examples of the magnetic disk are a flexible disk (FD) and a HDD. Examples of the optical disk are a compact disc (CD) and a digital versatile disc (DVD). The media reader 206 copies programs and data read from the storage medium 213 to a different storage medium, for example, the RAM 202 or the HDD 203. The read programs are executed, for example, by the CPU 201. Note that the storage medium 213 may be a portable storage medium, and may be used to distribute the programs and data. In addition, the storage medium 213 and the HDD 203 are sometimes referred to as computer-readable storage media.

The communication interface 207 is connected to a network 61 and communicates with different devices via the network 61. The communication interface 207 is a wired communication interface connected via a cable to a communication device, such as a switch. Note however that the communication interface 207 may be a wireless communication interface connected via a wireless link to a base station.

The connection interface 208 is used to connect to one or more PUF devices at one time. The PUF devices 100, 100-1, 100-2, and so on are detachable from the connection interface 208. For example, the PUF device 100 is connected to the connection interface 208 and then detached from the connection interface 208, and the PUF device 100-1 is subsequently connected thereto. Thus, the connection interface 208 allows connection to a plurality of PUF devices as switching from one PUF device to another. The connection interface 208 transmits a command to a PUF device currently connected thereto according to an instruction from the CPU 201. The connection interface 208 acquires, from the currently connected PUF device, data representing the result obtained by executing the command and notifies the CPU 201 of the acquired data.

Figure 6:
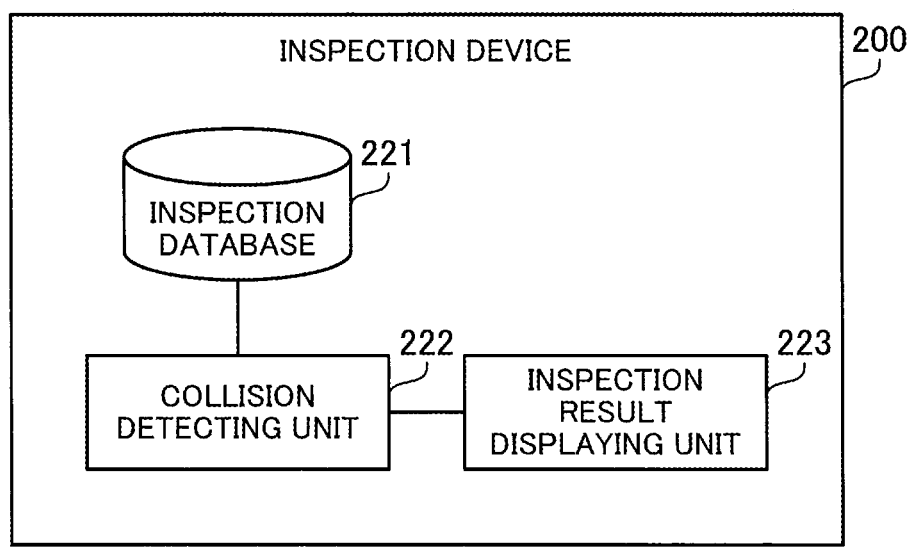
FIG. 6 is a block diagram illustrating an example of functions of the inspection device according to the second embodiment.

FIG. 6 is a block diagram illustrating an example of functions of an inspection device according to the second embodiment. The inspection device 200 includes an inspection database 221, a collision detecting unit 222, and an inspection result displaying unit 223. The inspection database 221 is implemented using a storage area secured, for example, in the RAM 202 or the HDD 203. The collision detecting unit 222 and the inspection result displaying unit 223 are implemented, for example, using a program executed by the CPU 201.

The inspection database 221 is used to compile data of PUF devices inspected thus far. The data compiled in the inspection database 221 depends on interfaces of a plurality of inspection-target PUF devices. According to the second embodiment, auxiliary data and hashes acquired from individual PUF devices are compiled in the inspection database 221.

When a new PUF device is connected to the inspection device 200, the collision detecting unit 222 inspects the connected PUF device using the data compiled in the inspection database 221. In the inspection of the PUF device, the collision detecting unit 222 determines whether the PUF value of the connected PUF device collisions with the PUF value of any of the PUF devices inspected thus far. The inspection method of the collision detecting unit 222 depends on interfaces of the inspection-target PUF devices. According to the second embodiment, the collision detecting unit 222 inputs the auxiliary data of an already inspected PUF device (existing auxiliary data) to the connected PUF device, and acquires a hash from this PUF device. Then, the collision detecting unit 222 determines that there is a PUF value collision when the acquired hash matches a hash of the already inspected PUF device (an existing hash). On the other hand, the collision detecting unit 222 determines that there is no PUF value collision when the two do not match.

The PUF devices according to the second embodiment correct PUF value fluctuation using an error correction technique. Therefore, a PUF value collision between two PUF devices takes place, not only when primitive PUF values match exactly, but also when PUF values of two PUF devices approximate closely to the extent that one of the two PUF values is correctable to the other, that is, when the PUF value fluctuation ranges of the two PUF devices overlap one another.

The inspection result displaying unit 223 presents inspection results of the collision detecting unit 222 on the display 211. For example, the inspection result displaying unit 223 presents, on the display 211, a message indicating "collision existing" or "no collision" for a currently connected PUF device. Alternatively, the inspection result displaying unit 223 may present a warning message on the display 211 only when a collision is determined to exist. In addition, the inspection device 200 may output the inspection results of the collision detecting unit 222 to a different output device. Specifically, the inspection device 200 may record the inspection results in a file, transfer the inspection results to a different device, or cause a printer to print out the inspection results, for example.

Figure 7:
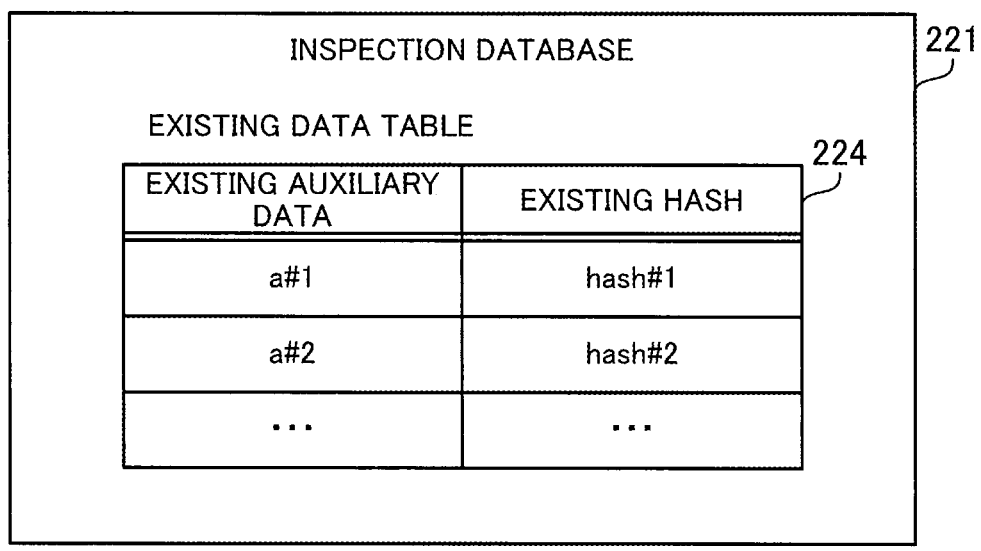
FIG. 7 illustrates an example of an existing data table according to the second embodiment.

FIG. 7 illustrates an example of an existing data table according to the second embodiment. According to the second embodiment, the inspection database 221 stores therein an existing data table 224. The existing data table 224 includes items of existing auxiliary data and existing hash. Each field under the item "existing auxiliary data" contains auxiliary data obtained from an already inspected PUF device. Each field under the item "existing hash" contains a hash acquired from an already inspected PUF device. In the existing data table 224, the existing auxiliary data of each PUF device is associated with the existing hash of the PUF device. Assume, for example, that auxiliary data a #1 and a hash hash #1 are acquired from the PUF device 100-1 and auxiliary data a #2 and a hash hash #2 are acquired from the PUF device 100-2. In this case, in the existing data table 224, the auxiliary data a #1 and the hash hash #1 are registered in association with each other while the auxiliary data a #2 and the hash hash #2 are registered in association with each other.

Figure 8:
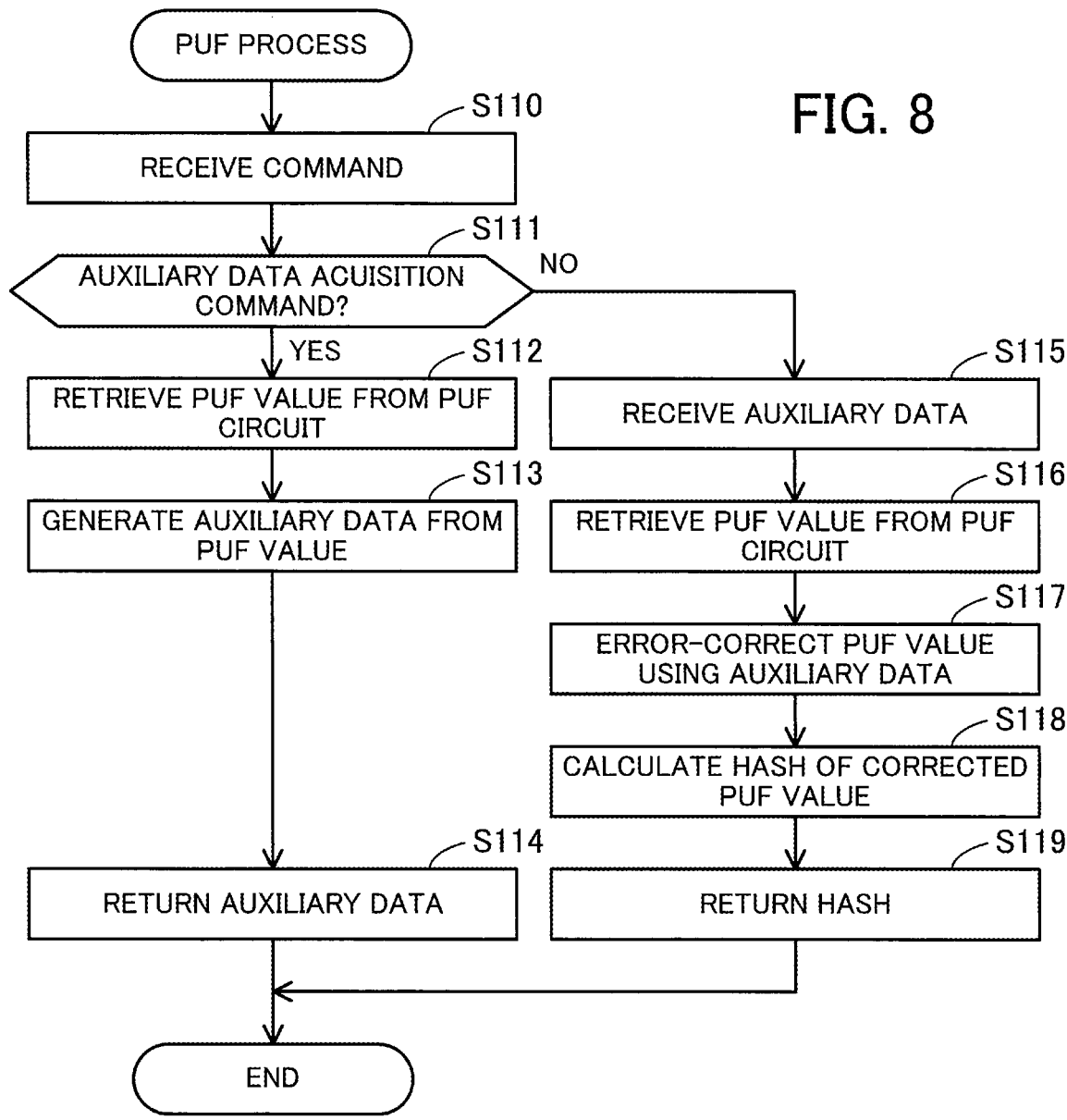
FIG. 8 is a flowchart illustrating a procedure example of a PUF process according to the second embodiment.

FIG. 8 is a flowchart illustrating a procedure example of a PUF process according to the second embodiment.

(Step S110) The input/output interface 101 receives a command from the inspection device 200. The input/output interface 101 outputs the received command to the control unit 102.

(Step S111) The control unit 102 determines whether the obtained command is an auxiliary data acquisition command. If the obtained command is an auxiliary data acquisition command, the process moves to step S112. If the obtained command is not an auxiliary data acquisition command, that is, the obtained command is a hash acquisition command, the process moves to step S115.

(Step S112) The control unit 102 causes the PUF circuit 103 to generate a PUF value and retrieves the PUF value from the PUF circuit 103. The PUF value is not statically recorded in the PUF circuit 103 as data; instead, it is generated on-the-fly by the PUF circuit 103 for each retrieving operation. PUF values thus generated are not necessarily always take the same value and may sometimes vary slightly.

(Step S113) The control unit 102 inputs the PUF value retrieved in step S112 to the auxiliary data generating unit 104. The auxiliary data generating unit 104 generates auxiliary data corresponding to the PUF value of step S112 using the above-described error correction technique. The auxiliary data is data used to correct a PUF value approximating the PUF value of step S112 (i.e., a PUF value whose Hamming distance is less than or equal to a correctable bit count) to the PUF value of step S112. The auxiliary data generating unit 104 outputs the generated auxiliary data to the control unit 102.

(Step S114) The control unit 102 outputs the auxiliary data obtained in step S113 to the input/output interface 101. The input/output interface 101 returns the auxiliary data as a response to the auxiliary data acquisition command.

(Step S115) The control unit 102 receives auxiliary data input thereto while being attached to the hash acquisition command. The auxiliary data received in this step may have been generated by the PUF device 100 or a different PUF device.

(Step S116) The control unit 102 causes the PUF circuit 103 to generate a PUF value and retrieves the PUF value from the PUF circuit 103, as in step S112. The PUF value retrieved in this step is not necessarily the same as the PUF value retrieved in step S112.

(Step S117) The control unit 102 inputs, to the error correcting unit 105, the PUF value retrieved in step S116 and the auxiliary data received in step S115. The error correcting unit 105 tries to error-correct the PUF value of step S116 using the auxiliary data of step S115 by means of the above-described error correction technique to thereby generate a corrected PUF value. If the PUF value of step S116 approximates a PUF value used to generate the auxiliary data of step S115 (i.e., if the Hamming distance is less than or equal to the correctable bit count), the corrected PUF value matches the PUF value used to generate the auxiliary data. If not, the corrected PUF value does not match the PUF value used to generate the auxiliary data. The error correcting unit 105 outputs the corrected PUF value generated in this step to the control unit 102.

(Step S118) The control unit 102 inputs the corrected PUF value obtained in step S117 to the hash function unit 106. The hash function unit 106 calculates a hash of the corrected PUF value using a predetermined hash function and outputs the hash to the control unit 102.

(Step S119) The control unit 102 outputs the hash obtained in step S118 to the input/output interface 101. The input/output interface 101 returns the hash as a response to the hash acquisition command.

Figure 9:
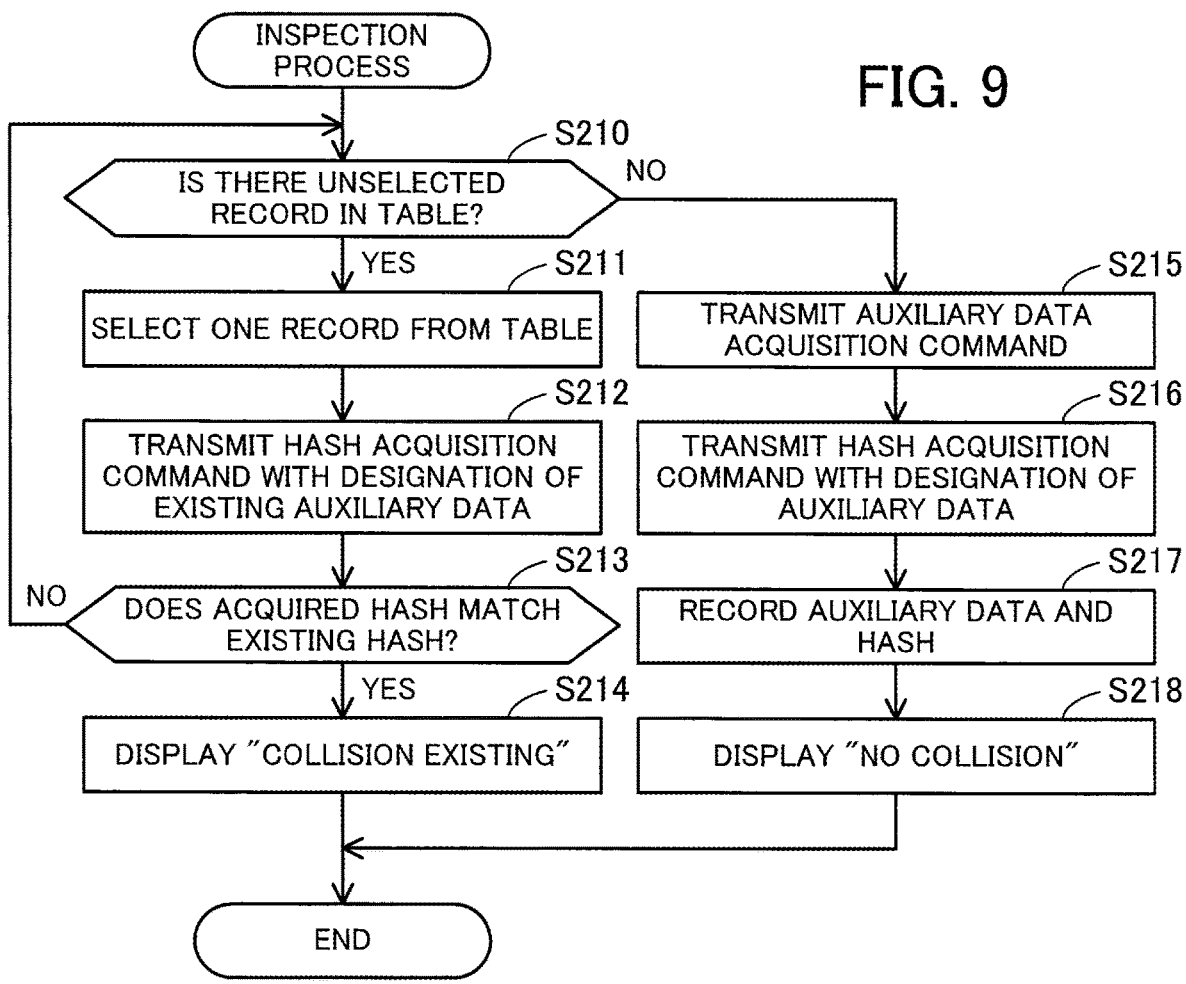
FIG. 9 is a flowchart illustrating a procedure example of an inspection process according to the second embodiment.

FIG. 9 is a flowchart illustrating a procedure example of an inspection process according to the second embodiment.

(Step S210) The collision detecting unit 222 determines whether there are one or more unselected records in the existing data table 224. If there are one or more unselected records, the process moves to step S211. On the other hand, if all the records have been selected, the process moves to step S215.

(Step S211) The collision detecting unit 222 selects, from the existing data table 224, one record associated with a PUF device inspected in the past, which is different from a PUF device currently connected to the inspection device 200. The selected record includes existing auxiliary data and an existing hash.

(Step S212) The collision detecting unit 222 transmits, to the currently connected PUF device, a hash acquisition command with designation of the existing auxiliary data obtained in step S211. The collision detecting unit 222 acquires a hash as a response to the hash acquisition command.

(Step S213) The collision detecting unit 222 determines whether the hash acquired in step S212 matches the existing hash of step S211. If the acquired hash matches the existing hash, the process moves to step S214. On the other hand, if the two do not match, then the process moves to step S210.

(Step S214) The collision detecting unit 222 determines that a PUF value collision exists between the currently connected PUF device and the PUF device inspected in the past. The inspection result displaying unit 223 presents a message of "collision existing" on the display 211.

(Step S215) The collision detecting unit 222 transmits an auxiliary data acquisition command to the currently connected PUF device, and then acquires auxiliary data as a response to the auxiliary data acquisition command.

(Step S216) The collision detecting unit 222 transmits, to the currently connected PUF device, a hash acquisition command with designation of the auxiliary data acquired in step S215. The collision detecting unit 222 acquires a hash as a response to the hash acquisition command.

(Step S217) The collision detecting unit 222 records, within the existing data table 224, the auxiliary data acquired in step S215 under the existing auxiliary data column and the hash acquired in step S216 under the existing hash column in association with each other.

(Step S218) The collision detecting unit 222 determines that there is no PUF value collision between the currently connected PUF device and the PUF device inspected in the past. The inspection result displaying unit 223 presents a message of "no collision" on the display 211.

The information processing system according to the second embodiment is able to detect, from outside a plurality of PUF devices each having a PUF circuit, PUF value collisions after manufacture of the PUF devices. This allows the implementation of measures, for example, avoiding the shipment or use of PUF devices with PUF value collisions, thus enhancing information security. In addition, the inspection device 200 is able to detect PUF value collisions without acquiring PUF values themselves, which eliminates the need to provide each PUF device with an interface for externally outputting its PUF value. This in turn improves the security of the PUF devices. Further, with the use of the error correction technique, it is possible to detect, as PUF value collisions, not only cases where PUF circuits of different PUF devices have generated identical PUF values but also cases where PUF circuits of different PUF devices have generated approximate PUF values, thus allowing absorption of PUF value fluctuation.

(c) Third Embodiment

Next described is a third embodiment. The following description focuses on differences from the second embodiment above, and repeated explanations may be omitted. An information processing system according to the third embodiment differs from that of the second embodiment in the functions of each PUF device and the inspection procedure. The information processing system according to the third embodiment is implemented using the same structure as the information processing system of the second embodiment illustrated in FIG. 2. In addition, an inspection device according to the third embodiment is implemented using the same structure as the inspection device of the second embodiment illustrated in FIGS. 5 and 6. The inspection device of the third embodiment is described below using the same reference numerals as those in the second embodiment.

Figure 10:
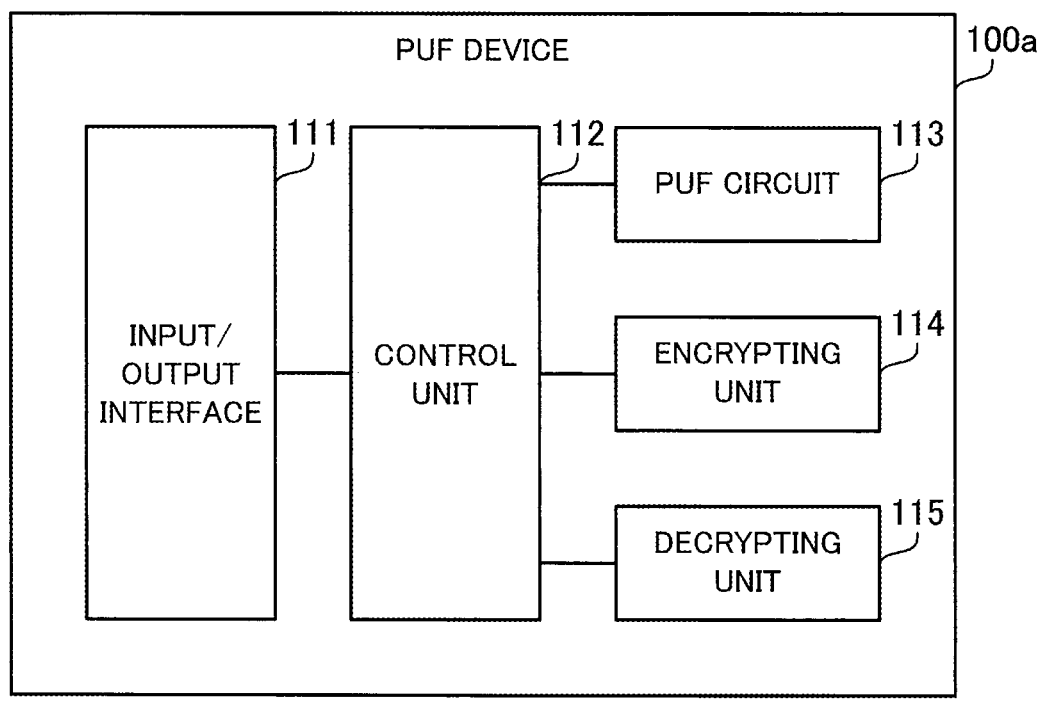
FIG. 10 is a block diagram illustrating an example of a PUF device according to a third embodiment.

FIG. 10 is a block diagram illustrating an example of a PUF device according to the third embodiment. A PUF device 100a is used in place of the PUF device 100 of the second embodiment. The PUF device 100a includes an input/output interface 111, a control unit 112, a PUF circuit 113, an encrypting unit 114, and a decrypting unit 115. A part of or the entire PUF device 100a may be implemented using a programmable device such as an FPGA. Alternatively, a part of or the entire PUF device 100a may be implemented using an ASIC.

The input/output interface 111 is an interface for receiving a command from the inspection device 200 and then outputting the result obtained by executing the command to the inspection device 200. Encryption commands and decryption commands are the types of commands used in the third embodiment. An encryption command is accompanied by plain text. In response to the encryption command, encrypted text generated by encrypting the plain text is output. A decryption command is accompanied by encrypted text. In response to the decryption command, plain text generated by decrypting the encrypted text is output. For the encryption and decryption, a PUF value generated inside the PUF device 100a is used; however, the PUF value itself is not output externally from the PUF device 100a.

The control unit 112 obtains a command from the input/output interface 111, then performs cryptographic processing using the PUF circuit 113, the encrypting unit 114, and the decrypting unit 115, and outputs the result of the cryptographic processing to the input/output interface 111. In response to an encryption command, the control unit 112 retrieves a PUF value from the PUF circuit 113, and inputs the retrieved PUF value and plain text attached to the encryption command to the encrypting unit 114 to thereby obtain encrypted text from the encrypting unit 114. In response to a decryption command, the control unit 112 retrieves a PUF value from the PUF circuit 113, and inputs the retrieved PUF value and encrypted text attached to the decryption command to the decrypting unit 115 to thereby obtain plain text from the decrypting unit 115.

The PUF circuit 113 is an electronic circuit for generating PUF values unique to its hardware using PUF technology, and corresponds to the PUF circuit 103 of the second embodiment.

The encrypting unit 114 obtains a PUF value and plain text from the control unit 112, and encrypts the plain text using the PUF value to thereby generate encrypted text, which is then output to the control unit 112. The PUF value is used as a cryptographic key. Because it is difficult to retrieve the PUF value from outside the PUF device 100a, the cryptographic key is protected by the PUF device 100a and it is therefore difficult to decrypt the encrypted text generated by the PUF device 100a using a different PUF device. Note however that some PUF value fluctuation takes place, and the encrypting unit 114 therefore uses an error correction technique to absorb the fluctuation.

As an example, the encrypting unit 114 calculates E2(P) by encoding plain text "P" using an error correction encoding function "E2". The encrypting unit 114 generates a random number "s" and performs a masking operation on E2(P) using the random number "s" to thereby calculate E2(P)+s. The encrypting unit 114 further encodes E2(P)+s using an error correction encoding function "E1" to calculate E1(E2(P)+s). Then, the encrypting unit 114 performs a masking operation on E1(E2(P)+s) using a PUF value "x" for encryption to thereby generate encrypted text "C", C=x+E1(E2(P)+s).

In the above description, the additional symbol "+" represents a bitwise exclusive OR. The Hamming weight (the count of bits that are "1") of the random number "s" is set to be less than or equal to a correctable bit count of the error correction encoding function "E2" (i.e., to fall within an error-correctable range of E2). The Hamming weight of the PUF value "x" is set to exceed a correctable bit count of the error correction encoding function "E1". The error correction encoding functions "E1" and "E2" may employ either the same or different types of coding schemes. The coding scheme used by the error correction encoding function "E1" is preferably a linear coding scheme. For example, the error correction encoding function "E1" uses a linear coding scheme of (n, $k_1$, $2d_1+1$) where "n" is the bit length after encoding, "$k_1$" is the bit length before encoding, and "$d_1$" is the correctable bit count. The error correction encoding function "E2" uses a linear or non-linear coding scheme of ($k_2$, p, $2d_2+1$) where "$k_2$" is the bit length after encoding, "p" is the bit length before encoding, and "$d_2$" is the correctable bit count. "$k_2$" is equal to or less than "$k_1$" ($k_2 \leq k_1$).

Some examples of linear codes include Hamming codes; Bose-Chaudhuri-Hocquenghem (BCH) codes; Reed-Solomon codes; Turbo codes; low-density parity-check (LDPC) codes; and convolution codes. Some examples of non-linear codes include Nordstrom-Robinson (NR) codes; Nadler codes; and Green codes. In the case where both the error correction encoding functions "E1" and "E2" employ Reed-Solomon codes, a conceivable implementation is n=2047; $k_1$=1023; $k_2$=511; and p=351. Alternatively, in the case where both the error correction encoding functions "E1" and "E2" employ BCH codes, a conceivable implementation is n=8191; $k_1$=1535; $k_2$=1023; and p=223.

As a different example, the encrypting unit 114 calculates E1(P) by encoding the plain text "P" using the error correction encoding function "E1". The encrypting unit 114 performs a masking operation on E1(P) using the PUF value "x" generated by the PUF circuit 113 to thereby generate encrypted text "C", C=x+E1(P). Note however that, in the case of storing the plain text "P" and the encrypted text "C" over long periods or making them publicly available, it is preferable to use the above encrypted text C=x+E1(E2(P)+s) in order to reduce the risk of the PUF value "x" being deduced and then leaked. The use of the random number "s" lowers the risk of the PUF value "x" being deduced.

The decrypting unit 115 obtains a PUF value and encrypted text from the control unit 112, and decrypts the encrypted text using the PUF value to thereby generate plain text, which is then output to the control unit 112. The PUF value is used as a cryptographic key. Because the PUF value used in encryption does not always match that used in decryption, the decrypting unit 115 employs an error-correction technique to absorb the PUF value fluctuation.

As an example, the decrypting unit 115 performs a masking operation on encrypted text "C" using a PUF value "y" for decryption to thereby calculate y+C. The decrypting unit 115 decrypts y+C using an error correction decoding function "D1" corresponding to the error correction encoding function "E1", to thereby calculate D1(y+C). Then, the decrypting unit 115 further decrypts D1(y+C) using an error correction decoding function "D2" corresponding to the error correction encoding function "E2", to thereby generate plain text "P", P=D2(D1(y+C)).

In the case where the encrypted text C=x+E1(E2(P)+s) is input, y+C=x+y+E1(E2(P)+s) is obtained. When the Hamming distance between the PUF values "x" and "y" is less than or equal to a correctable bit count of the error correction decoding function "D1", x+y is removable noise, which leads to D1(y+C)=E2(P)+s. The correctable bit count of the error correction decoding function "D1" is set in such a manner that the Hamming distance between PUF values generated by the same PUF circuit is less than or equal to the correctable bit count. Then, because the Hamming weight of the random number "s" is less than or equal to a correctable bit count of the error correction decoding function "D2", D2(E2(P)+s)=P is true, and thus the plain text "P" is extracted correctly.

As a different example, the decrypting unit 115 performs a masking operation on the encrypted text "C" using the PUF value "y" generated for decryption to thereby calculate y+C. The decrypting unit 115 decrypts y+C using the error correction decoding function D1 to thereby calculate plain text "P", P=D1(y+C). In the case where the encrypted text C=x+E1(P) is input, y+C=x+y+E1(P) is obtained. When the Hamming distance between the PUF values "x" and "y" is less than or equal to the correctable bit count of the error correction decoding function "D1", D1(y+C)=D1(x+y+E1(P))=P is true, and thus the plain text "P" is extracted correctly.

Figure 11:
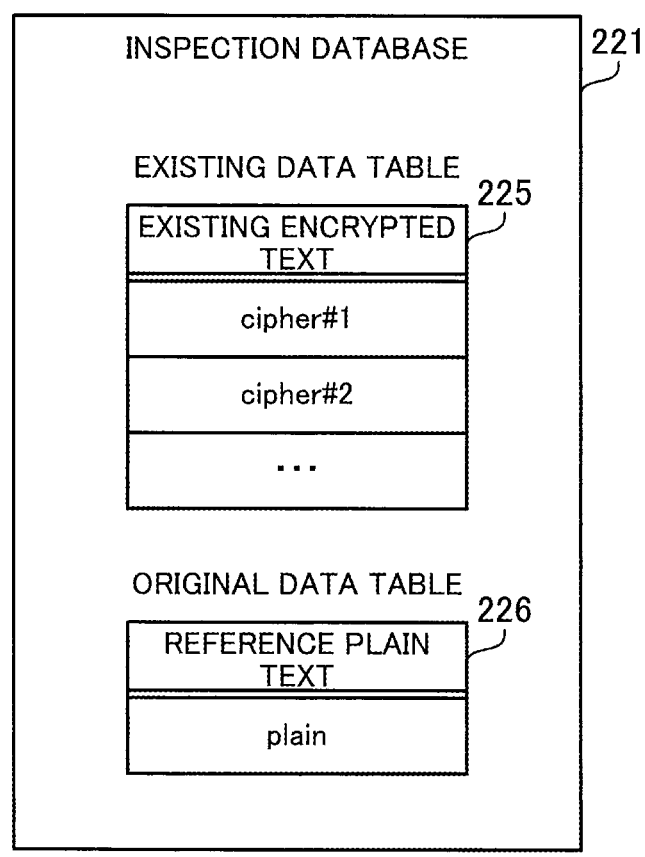
FIG. 11 illustrates an example of tables according to the third embodiment.

FIG. 11 illustrates an example of tables according to the third embodiment. According to the third embodiment, the inspection database 221 stores therein an existing data table 225 and an original data table 226. The existing data table 225 includes an item of existing encrypted text. Each field under the item "existing encrypted text" contains encrypted text acquired from an already inspected PUF device. The original data table 226 includes an item of reference plain text. A field under the item "reference plain text" contains in advance plain text commonly used for inspection of a plurality of PUF devices.

For example, plain text "plain" registered in the original data table 226 is input to a single PUF device. When encrypted text "cipher #1" corresponding to the plain text "plain" is acquired from the single PUF device, the encrypted text "cipher #1" is registered in the existing data table 225. In addition, the plain text "plain" registered in the original data table 226 is input to a different PUF device. When encrypted text "cipher #2" corresponding to the plain text "plain" is acquired from the different PUF device, the encrypted text "cipher #2" is registered in the existing data table 225.

Figure 12:
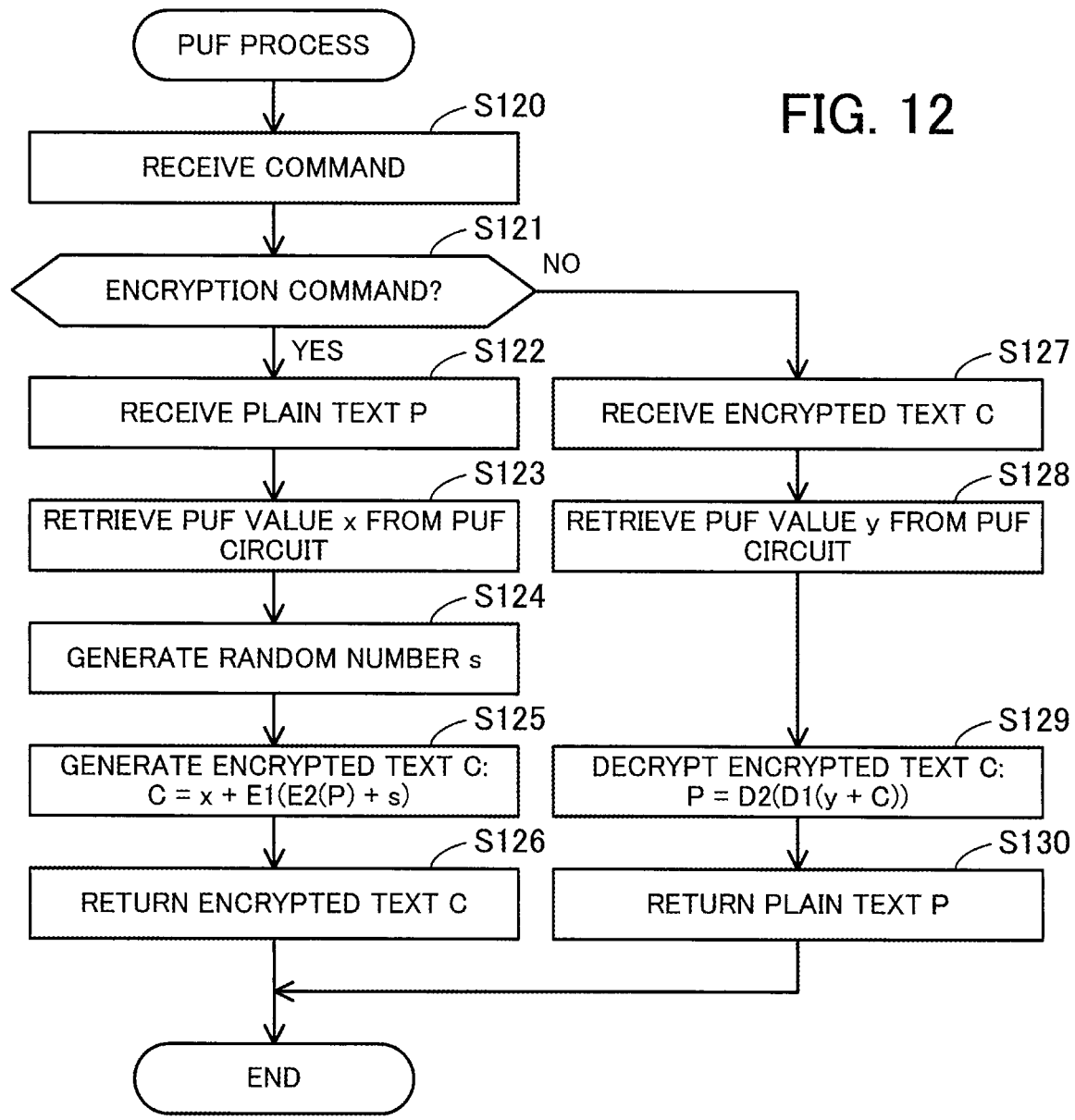
FIG. 12 is a flowchart illustrating a procedure example of a PUF process according to the third embodiment.

FIG. 12 is a flowchart illustrating a procedure example of a PUF process according to the third embodiment.

(Step S120) The input/output interface 111 receives a command from the inspection device 200. The input/output interface 111 outputs the received command to the control unit 112.

(Step S121) The control unit 112 determines whether the obtained command is an encryption command. If the obtained command is an encryption command, the process moves to step S122. If the obtained command is not an encryption command, that is, the obtained command is a decryption command, the process moves to step S127.

(Step S122) The control unit 112 receives plain text "P" input thereto while being attached to the encryption command. As the plain text "P", the reference plain text in the original data table 226 is assumed here.

(Step S123) The control unit 112 retrieves the PUF value "x" from the PUF circuit 113.

(Step S124) The control unit 112 inputs the plain text "P" received in step S122 and the PUF value "x" retrieved in step S123 to the encrypting unit 114. The encrypting unit 114 generates the random number "s" whose Hamming weight meets a predetermined condition.

(Step S125) The encrypting unit 114 uses the predetermined error correction encoding functions "E1" and "E2", the input plain text "P", the PUF value "x", and the random number "s" generated in step S124 to thereby generate the encrypted text "C" according to a predetermined encryption procedure. For example, the encrypting unit 114 generates C=x+E1(E2(P)+s). Note however that the encrypted text "C" may be generated in a different way. The encrypting unit 114 outputs the generated encrypted text "C" to the control unit 112.

(Step S126) The control unit 112 outputs the encrypted text "C" to the input/output interface 111. The input/output interface 111 returns the encrypted text "C" as a response to the encrypted command.

(Step S127) The control unit 112 receives the encrypted text "C" input thereto while being attached to the decryption command. As the encrypted text "C", existing encrypted text in the existing data table 225 is assumed here.

(Step S128) The control unit 112 retrieves the PUF value "y" from the PUF circuit 113. The PUF value "y" retrieved in this step is not necessarily the same as the PUF value "x" of step S123.

(Step S129) The control unit 112 inputs, to the decrypting unit 115, the encrypted text "C" received in step S127 and the PUF value "y" retrieved in step S128. The decrypting unit 115 uses the predetermined error correction decoding functions "D1" and "D2", the input encrypted text "C", and the PUF value "y" to thereby generate the plain text "P" according to a predetermined decryption procedure. For example, the decrypting unit 115 generates P=D2(D1(y+C)). Note however that the plain text "P" may be generated in a different way. Only when the PUF value "x" used in the encryption and the PUF value "y" used in the decryption approximate each other, the original plain text is correctly extracted from the encrypted text "C". The decrypting unit 115 outputs the generated plain text "P" to the control unit 112.

(Step S130) The control unit 112 outputs the plain text "P" to the input/output interface 111. The input/output interface 111 returns the plain text "P" as a response to the decryption command.

Figure 13:
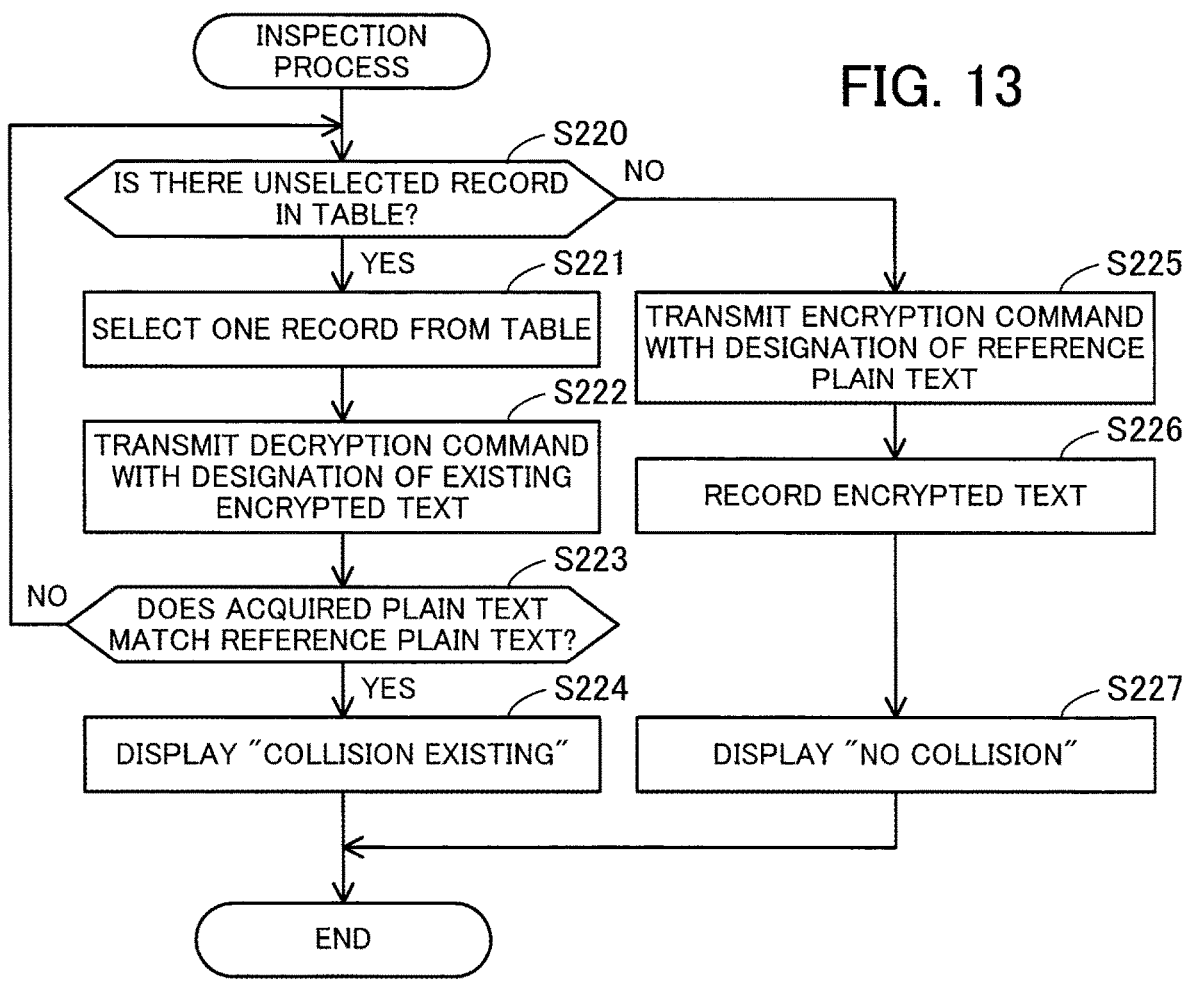
FIG. 13 is a flowchart illustrating a procedure example of an inspection process according to the third embodiment.

FIG. 13 is a flowchart illustrating a procedure example of an inspection process according to the third embodiment.

(Step S220) The collision detecting unit 222 determines whether there are one or more unselected records in the existing data table 225. If there are one or more unselected records, the process moves to step S221. On the other hand, if all the records have been selected, the process moves to step S225.

(Step S221) The collision detecting unit 222 selects, from the existing data table 225, one record associated with a PUF device inspected in the past, which is different from a PUF device currently connected to the inspection device 200. The selected record includes existing encrypted text.

(Step S222) The collision detecting unit 222 transmits, to the currently connected PUF device, a decryption command with designation of the existing encrypted text obtained in step S221. The collision detecting unit 222 acquires plain text, which is the result of decryption, as a response to the decryption command.

(Step S223) The collision detecting unit 222 determines whether the plain text acquired in step S222 matches the reference plain text registered in the original data table 226. If the plain text matches the reference plain text, the process moves to step S224. On the other hand, if the two do not match, then the process moves to step S220.

(Step S224) The collision detecting unit 222 determines that a PUF value collision exists between the currently connected PUF device and the PUF device inspected in the past. The inspection result displaying unit 223 presents a message of "collision existing" on the display 211.

(Step S225) The collision detecting unit 222 transmits, to the currently connected PUF device, an encryption command with designation of the reference plain text registered in the original data table 226. The collision detecting unit 222 acquires encrypted text as a response to the encryption command.

(Step S226) The collision detecting unit 222 registers, in the existing data table 225, the encrypted text acquired in step S225 as existing encrypted text.

(Step S227) The collision detecting unit 222 determines that there is no PUF value collision between the currently connected PUF device and the PUF device inspected in the past. The inspection result displaying unit 223 presents a message of "no collision" on the display 211.

The information processing system of the third embodiment achieves the same effect as the second embodiment. Further, the information processing system of the third embodiment performs encryption and decryption inside each PUF device using, as a cryptographic key, a PUF value difficult to retrieve from outside the PUF device. This protects the cryptographic key, and also makes it difficult for a PUF device to decrypt data encrypted by a different PUF device, thus enhancing information security.

(d) Fourth Embodiment

Next described is a fourth embodiment. The following description focuses on differences from the second and third embodiments above, and repeated explanations may be omitted. An information processing system according to the fourth embodiment differs from that of the second and third embodiments in the functions of each PUF device and the inspection procedure. The information processing system according to the fourth embodiment is implemented using the same structure as the information processing system of the second embodiment illustrated in FIG. 2. In addition, an inspection device according to the fourth embodiment is implemented using the same structure as the inspection device of the second embodiment illustrated in FIGS. 5 and 6. The inspection device of the fourth embodiment is described below using the same reference numerals as those in the second embodiment.

Figure 14:
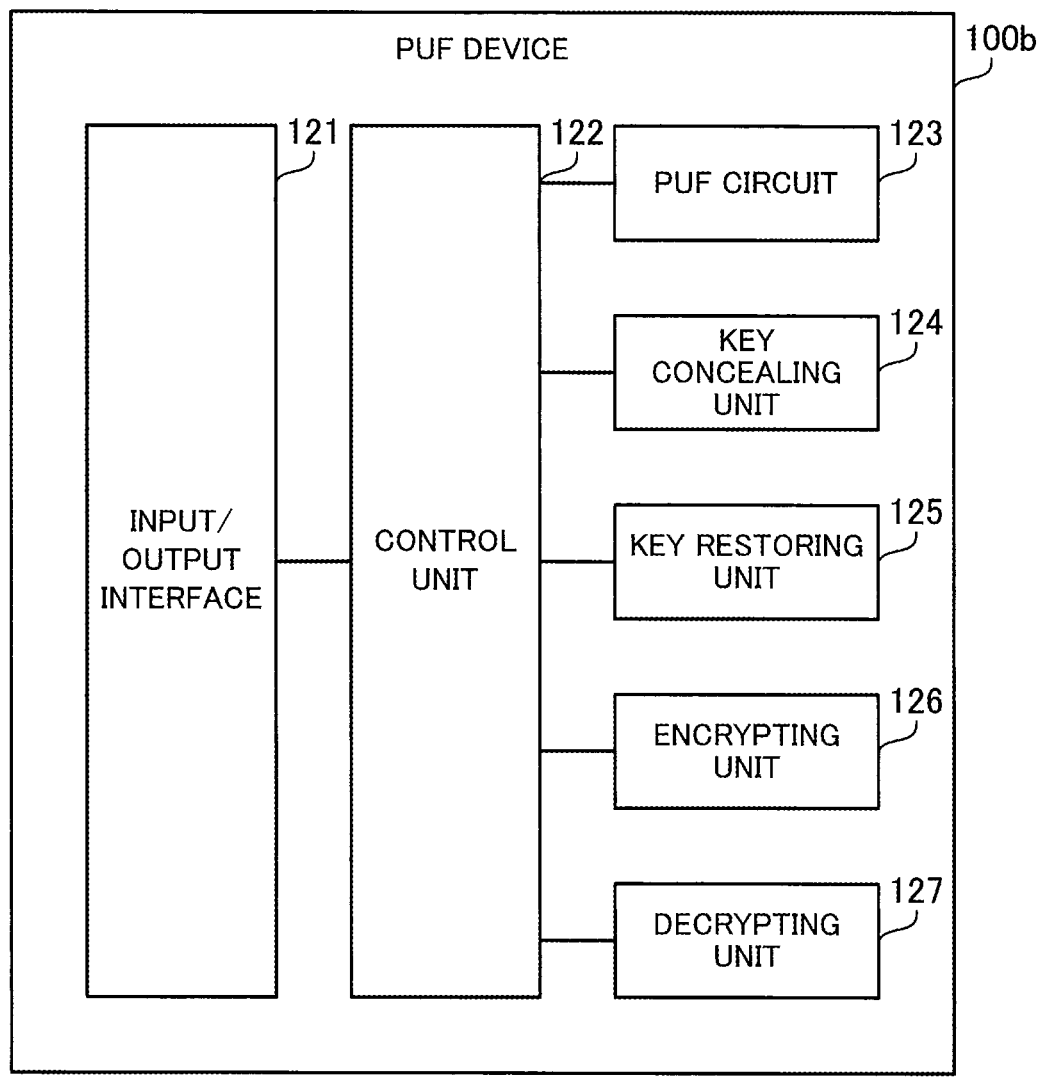
FIG. 14 is a block diagram illustrating an example of a PUF device according to a fourth embodiment.

FIG. 14 is a block diagram illustrating an example of a PUF device according to the fourth embodiment. A PUF device 100b is used in place of the PUF device 100 of the second embodiment. The PUF device 100b includes an input/output interface 121, a control unit 122, a PUF circuit 123, a key concealing unit 124, a key restoring unit 125, an encrypting unit 126, and a decrypting unit 127. A part of or the entire PUF device 100b may be implemented using a programmable device, such as an FPGA, or an ASIC.

The input/output interface 121 is an interface for receiving a command from the inspection device 200 and then outputting the result obtained by executing the command to the inspection device 200. Key concealment commands, encryption commands, and decryption commands are the types of commands used in the fourth embodiment. A key concealment command is accompanied by a cryptographic key. In response to the key concealment command, a concealed cryptographic key generated by encrypting the cryptographic key is output. An encryption command is accompanied by plain text and a concealed cryptographic key. In response to the encryption command, encrypted text generated by encrypting the plain text is output. A decryption command is accompanied by encrypted text and a concealed cryptographic key. In response to the decryption command, plain text generated by decrypting the encrypted text is output. Although a PUF value is used in the concealment and restoration of the cryptographic key, the PUF value itself is not output externally from the PUF device 100b.

The control unit 122 obtains a command from the input/output interface 121, then performs cryptographic processing using the PUF circuit 123, the key concealing unit 124, the key restoring unit 125, the encrypting unit 126, and the decrypting unit 127, and outputs the result of the cryptographic processing to the input/output interface 121.

In response to a key concealment command, the control unit 122 retrieves a PUF value from the PUF circuit 123, and inputs the retrieved PUF value and a cryptographic key attached to the key concealment command to the key concealing unit 124, to thereby obtain a concealed cryptographic key from the key concealing unit 124. In response to an encryption command, the control unit 122 retrieves a PUF value from the PUF circuit 123, and inputs the retrieved PUF value and a concealed cryptographic key attached to the encryption command to the key restoring unit 125, to thereby obtain a cryptographic key from the key restoring unit 125. Then, the control unit 122 inputs the restored cryptographic key and plain text attached to the encryption command to the encrypting unit 126, to thereby obtain encrypted text from the encrypting unit 126. In response to a decryption command, the control unit 122 retrieves a PUF value from the PUF circuit 123 as in the case of encryption, and inputs the retrieved PUF value and a concealed cryptographic key attached to the decryption command to the key restoring unit 125, to thereby obtain a cryptographic key from the key restoring unit 125. Then, the control unit 122 inputs the restored cryptographic key and encrypted text attached to the decryption command to the decrypting unit 127, to thereby obtain plain text from the decrypting unit 127.

The PUF circuit 123 is an electronic circuit for generating PUF values unique to its hardware using PUF technology, and corresponds to the PUF circuit 103 of the second embodiment.

The key concealing unit 124 obtains a PUF value and a cryptographic key from the control unit 122, and encrypts (i.e., conceals) the cryptographic key using the PUF value to thereby generate a concealed cryptographic key, which is then output to the control unit 122. Outside the PUF device 100b, not the cryptographic key itself but the concealed cryptographic key is stored, thereby protecting the cryptographic key. Because it is difficult to retrieve the PUF value from outside the PUF device 100b, restoring an original cryptographic key from the concealed cryptographic key generated by the PUF device 100b is difficult without the PUF device 100b. Note however that some PUF value fluctuation takes place, and the key concealing unit 124 therefore uses an error correction technique to absorb the fluctuation, as does the above encrypting unit 114 of the third embodiment.

As an example, the key concealing unit 124 calculates E2(key) by encoding a cryptographic key "key" using the error correction encoding function "E2". The key concealing unit 124 generates a random number and performs a masking operation on E2(key) using the random number "s" to thereby calculate E2(key)+s. The key concealing unit 124 further encodes E2(key)+s using the error correction encoding function "E1" to calculate E1(E2(key)+s). Then, the key concealing unit 124 performs a masking operation on E1(E2 (key)+s) using a PUF value "x" for key concealment to thereby generate a concealed cryptographic key "skey", skey=x+E1(E2(key)+s). Attributes of the error correction encoding functions "E1" and "E2", the random number "s", and the PUF value "x" here are the same as those described in the third embodiment.

As a different example, the key concealing unit 124 calculates E1(key) by encoding the cryptographic key "key" using the error correction encoding function "E1". The key concealing unit 124 performs a masking operation on E1(key) using the PUF value "x" to thereby generate a concealed cryptographic key "skey", skey=x+E1(key). Note however that, in the case of storing the cryptographic key "key" and the concealed cryptographic key "skey" over long periods or making them publicly available, it is preferable to use the above concealed cryptographic key skey=x+E1(E2 (key)+s) in order to reduce the risk of the PUF value "x" being deduced and then leaked.

The key restoring unit 125 obtains a PUF value and a concealed cryptographic key from the control unit 122, then restores a cryptographic key from the concealed cryptographic key using the PUF value, and outputs the cryptographic key to the control unit 122. Because the PUF value used in the concealment does not always match that used in the restoration, the key restoring unit 125 employs an error-correction technique to absorb the PUF value fluctuation.

As an example, the key restoring unit 125 performs a masking operation on a concealed cryptographic key "skey" using a PUF value "y" for restoration to thereby calculate y+skey. The key restoring unit 125 decrypts y+skey using the error correction decoding function "D1" to thereby calculate D1(y+skey). Then, the key restoring unit 125 further decrypts D1(y+skey) using the error correction decoding function "D2" to thereby generate a cryptographic key "key", key=D2(D1(y+skey)).

In the case where the concealed cryptographic key skey=x+E1(E2(key)+s) is input, y+skey=x+y+E1(E2(key)+ s) is obtained. When the Hamming distance between the PUF values "x" and "y" is less than or equal to the correctable bit count of the error correction decoding function "D1", D2(D1(x+y+E1(E2(key)+s)))=D2(E2(key)+s) =key is true. Attributes of the error correction decoding functions "D1" and "D2" and the PUF value "y" here are the same as those described in the third embodiment.

As a different example, the key restoring unit 125 performs a masking operation on the concealed cryptographic key "skey" using the PUF value "y" for restoration to thereby calculate y+skey. The key restoring unit 125 decrypts y+skey using the error correction decoding function "D1" to thereby calculate a cryptographic key "key", key=D1(y+skey). In the case where the concealed cryptographic key skey=x+E1(key) is input, y+skey=x+y+E1(key) is obtained. When the Hamming distance between the PUF values "x" and "y" is less than or equal to the correctable bit count of the error correction decoding function "D1", D1(x+ y+E1(key))=key is true.

The encrypting unit 126 obtains a cryptographic key and plain text from the control unit 122, and encrypts the plain text using the cryptographic key to generate encrypted text, which is then output to the control unit 122. The encrypting unit 126 uses a predetermined symmetric-key cryptosystem, such as Advanced Encryption Standard (AES). The encrypting unit 126 uses the input cryptographic key as a common key of the symmetric-key cryptosystem. In encryption, a concealed cryptographic key is input to the PUF device 100b from outside, and a cryptographic key is temporarily restored inside the PUF device 100b and then destroyed after encryption is complete. The restored cryptographic key is not output externally from the PUF device 100b and is thus protected.

The decrypting unit 127 obtains a cryptographic key and encrypted text from the control unit 122, and decrypts the encrypted text using the cryptographic key to generate plain text, which is then output to the control unit 122. The decrypting unit 127 uses a predetermined symmetric-key cryptosystem, such as AES, corresponding to a cryptographic processing method of the encrypting unit 126. The decrypting unit 127 uses the input cryptographic key as a common key of the symmetric-key cryptosystem. In decryption, a concealed cryptographic key is input to the PUF device 100b from outside, and a cryptographic key is temporarily restored inside the PUF device 100b and then destroyed after decryption is complete. The restored cryptographic key is not output externally from the PUF device 100b and is thus protected.

Figure 15:
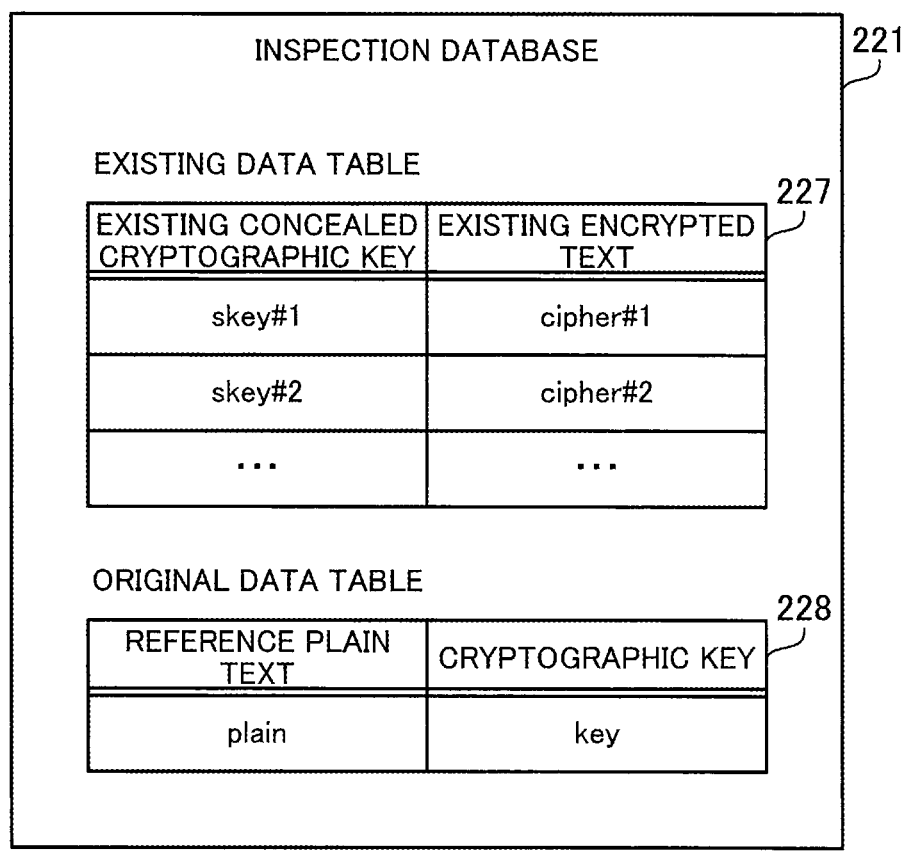
FIG. 15 illustrates an example of tables according to the fourth embodiment.

FIG. 15 illustrates an example of tables according to the fourth embodiment. According to the fourth embodiment, the inspection database 221 stores therein an existing data table 227 and an original data table 228. The existing data table 227 includes items of existing concealed cryptographic key and existing encrypted text. Each field under the item "existing concealed cryptographic key" contains a concealed cryptographic key acquired from an already inspected PUF device. Each field under the item "existing encrypted text" contains encrypted text acquired from an already inspected PUF device. In the existing data table 227, the existing concealed cryptographic key of each PUF device is associated with the existing encrypted text of the PUF device. The original data table 228 includes items of reference plain text and cryptographic key. A field under the item "reference plain text" contains in advance plain text commonly used for inspection of a plurality of PUF devices. A field under the item "cryptographic key" contains in advance a cryptographic key commonly used for inspection of a plurality of PUF devices.

For example, a cryptographic key "key" registered in the original data table 228 is input to a single PUF device, and then a concealed cryptographic key "skey #1" generated from the cryptographic key "key" is acquired from the PUF device. Then, plain text "plain" registered in the original data table 228 and the concealed cryptographic key "skey #1" are input to the PUF device, and encrypted text "cipher #1" corresponding to the plain text "plain" is acquired from the PUF device. The concealed cryptographic key "skey #1" and the encrypted text "cipher #1" are registered in the existing data table 227 in association with each other.

Similarly, the cryptographic key "key" is input to a different PUF device, and a concealed cryptographic key "skey #2" generated from the cryptographic key "key" is acquired from the different PUF device. Then, the plain text "plain" and the concealed cryptographic key "skey #2" are input to the different PUF device, and encrypted text "cipher #2" corresponding to the plain text "plain" is acquired from the different PUF device. The concealed cryptographic key "skey #2" and the encrypted text "cipher #2" are registered in the existing data table 227 in association with each other.

Figure 16:
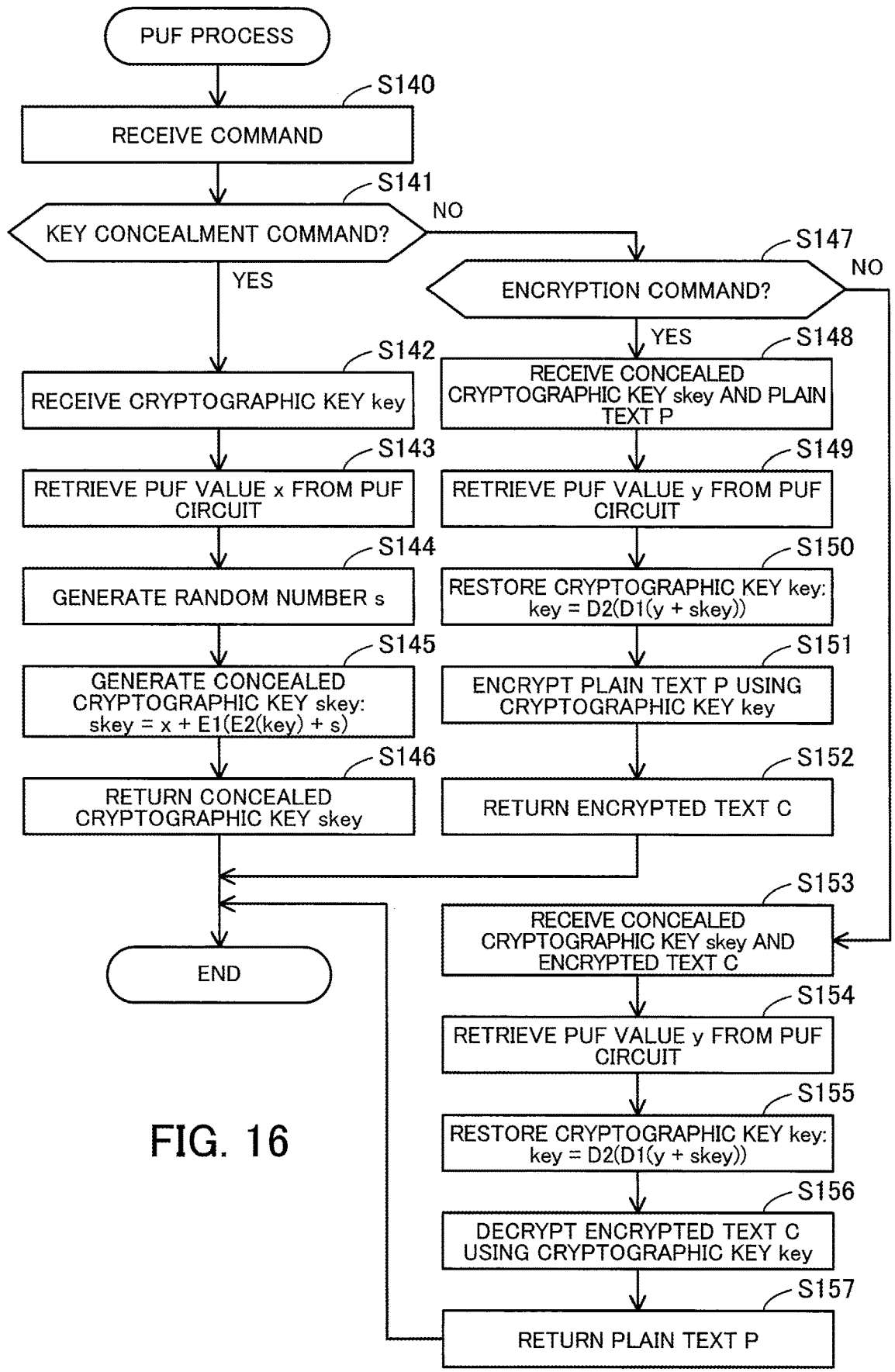
FIG. 16 is a flowchart illustrating a procedure example of a PUF process according to the fourth embodiment.

FIG. 16 is a flowchart illustrating a procedure example of a PUF process according to the fourth embodiment.

(Step S140) The input/output interface 121 receives a command from the inspection device 200. The input/output interface 121 outputs the received command to the control unit 122.

(Step S141) The control unit 122 determines whether the obtained command is a key concealment command. If the obtained command is a key concealment command, the process moves to step S142. If the obtained command is not a key concealment command, the process moves to step S147.

(Step S142) The control unit 122 receives a cryptographic key "key" input thereto while being attached to the key concealment command. As the cryptographic key "key", the cryptographic key in the original data table 228 is assumed here.

(Step S143) The control unit 122 retrieves the PUF value "x" from the PUF circuit 123.

(Step S144) The control unit 122 inputs the cryptographic key "key" received in step S142 and the PUF value "x" retrieved in step S143 to the key concealing unit 124. The key concealing unit 124 generates the random number "s" whose Hamming weight meets a predetermined condition.

(Step S145) The key concealing unit 124 uses the predetermined error correction encoding functions "E1" and "E2", the input cryptographic key "key", the PUF value "x", and the random number "s" generated in step S144 to thereby generate the concealed cryptographic key "skey" according to a predetermined encryption procedure. For example, the key concealing unit 124 generates skey=x+E1 (E2(key)+s). Note however that the concealed cryptographic key "skey" may be generated in a different way. The key concealing unit 124 outputs the generated concealed cryptographic key "skey" to the control unit 122.

(Step S146) The control unit 122 outputs the concealed cryptographic key "skey" to the input/output interface 121. The input/output interface 121 returns the concealed cryptographic key "skey" as a response to the key concealment command.

(Step S147) The control unit 122 determines whether the obtained command is an encryption command. If the obtained command is an encryption command, the process moves to step S148. If the obtained command is not an encryption command, that is, the obtained command is a decryption command, the process moves to step S153.

(Step S148) The control unit 122 receives a concealed cryptographic key "skey" and plain text "P" input thereto while being attached to the encryption command. As the concealed cryptographic key "skey" and the plain text "P", the concealed cryptographic key generated by the PUF device 100b and the reference plain text in the original data table 228, respectively, are assumed here.

(Step S149) The control unit 122 retrieves the PUF value "y" from the PUF circuit 123. The PUF value "y" retrieved in this step is not necessarily the same as the PUF value "x" of step S143.

(Step S150) The control unit 122 inputs, to the key restoring unit 125, the concealed cryptographic key "skey" received in step S148 and the PUF value "y" retrieved in step S149. The key restoring unit 125 uses the predetermined error correction decoding functions "D1" and "D2", the input concealed cryptographic key "skey", and the PUF value "y" to thereby restore the cryptographic key "key" according to a predetermined decryption procedure. For example, the key restoring unit 125 generates key=D2(D1 (y+skey)). Note however that the cryptographic key "key" may be generated in a different way. Only when the PUF value "x" used in the concealment and the PUF value "y" used in the decryption approximate each other, the original cryptographic key "key" is correctly extracted from the concealed cryptographic key "skey". The key restoring unit 125 outputs the cryptographic key "key" to the control unit 122.

(Step S151) The control unit 122 inputs, to the encrypting unit 126, the plain text "P" received in step S148 and the cryptographic key "key" obtained in step S150. The encrypting unit 126 encrypts the plain text "P" using the cryptographic key "key" to generate encrypted text "C", which is then output to the control unit 122.

(Step S152) The control unit 122 outputs the encrypted text "C" to the input/output interface 121. The input/output interface 121 returns the encrypted text "C" as a response to the encryption command.

(Step S153) The control unit 122 receives a concealed cryptographic key "skey" and encrypted text "C" input thereto while being attached to the decryption command. As the concealed cryptographic key "skey", any one of the existing concealed cryptographic keys registered in the existing data table 227 is assumed here. As the encrypted text "C", existing encrypted text corresponding to the existing concealed cryptographic key is assumed here.

(Step S154) The control unit 122 retrieves the PUF value "y" from the PUF circuit 123.

(Step S155) The control unit 122 inputs the concealed cryptographic key "skey" received in step S153 and the PUF value "y" retrieved in step S154 to the key restoring unit 125. The key restoring unit 125 restores the cryptographic key "key" in a manner similar to step S150. The key restoring unit 125 outputs the cryptographic key "key" to the control unit 122.

(Step S156) The control unit 122 inputs the encrypted text "C" received in step S153 and the cryptographic key "key" obtained in step S155 to the decryption unit 127. The decrypting unit 127 decrypts the encrypted text "C" using the cryptographic key "key" to obtain the plain text "P", which is then output to the control unit 122.

(Step S157) The control unit 122 outputs the plain text "P" to the input/output interface 121. The input/output interface 121 then returns the plain text "P" as a response to the decryption command.

Figure 17:
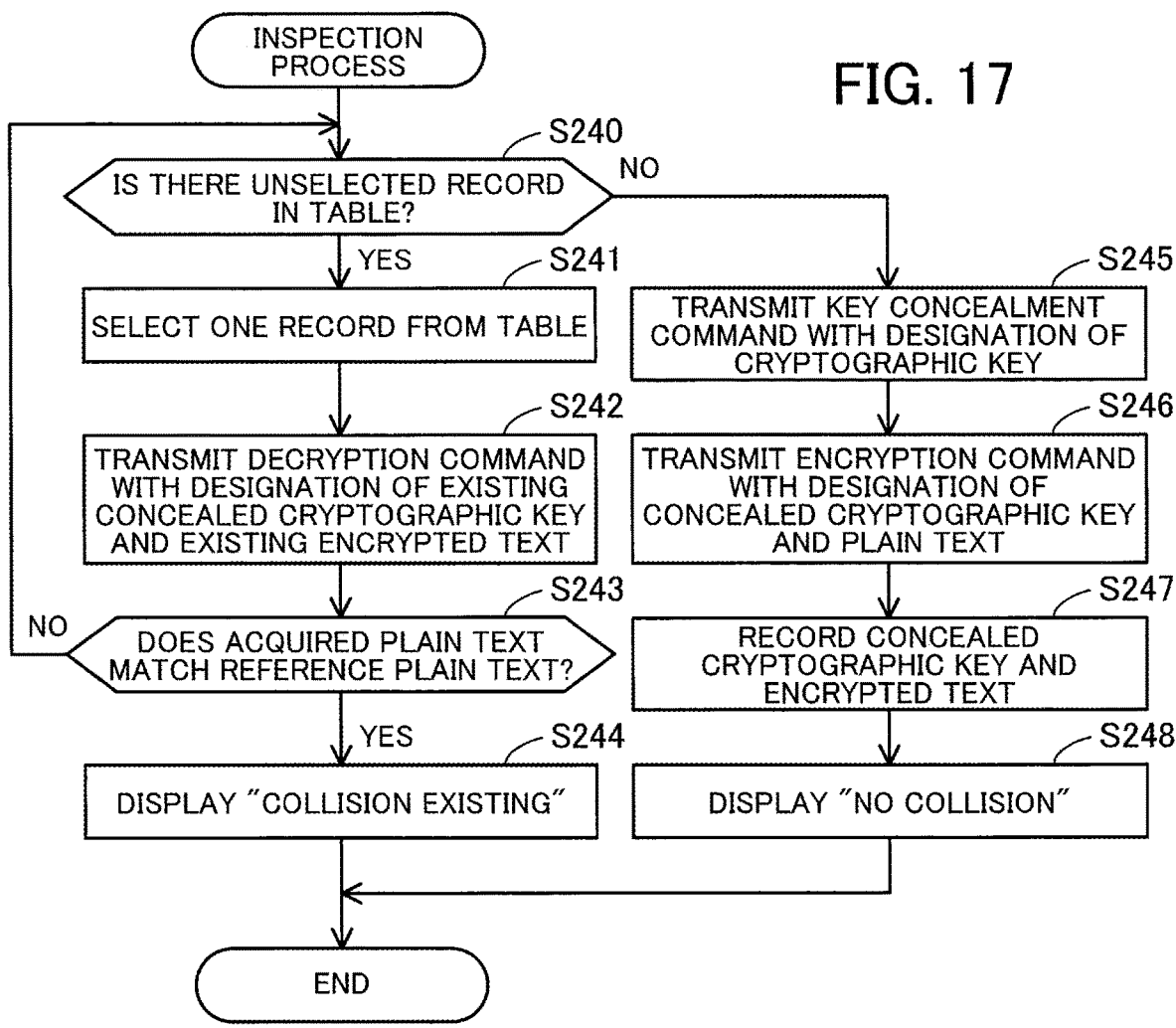
FIG. 17 is a flowchart illustrating a procedure example of an inspection process according to the fourth embodiment.

FIG. 17 is a flowchart illustrating a procedure example of an inspection process according to the fourth embodiment.

(Step S240) The collision detecting unit 222 determines whether there are one or more unselected records in the existing data table 227. If there are one or more unselected records, the process moves to step S241. On the other hand, if all the records have been selected, the process moves to step S245.

(Step S241) The collision detecting unit 222 selects, from the existing data table 227, one record associated with a PUF device inspected in the past, which is different from a PUF device currently connected to the inspection device 200. The selected record includes an existing concealed cryptographic key and existing encrypted text.

(Step S242) The collision detecting unit 222 transmits, to the currently connected PUF device, a decryption command with designation of the existing concealed cryptographic key and the existing encrypted text obtained in step S241. The collision detecting unit 222 acquires plain text, which is the result of decryption, as a response to the decryption command.

(Step S243) The collision detecting unit 222 determines whether the plain text acquired in step S242 matches the reference plain text registered in the original data table 228. If the plain text matches the reference plain text, the process moves to step S244. On the other hand, if the two do not match, then the process moves to step S240.

(Step S244) The collision detecting unit 222 determines that a PUF value collision exists between the currently connected PUF device and the PUF device inspected in the past. The inspection result displaying unit 223 presents a message of "collision existing" on the display 211.

(Step S245) The collision detecting unit 222 transmits, to the currently connected PUF device, a key concealment command with designation of the cryptographic key registered in the original data table 228. The collision detecting unit 222 acquires a concealed cryptographic key as a response to the key concealment command.

(Step S246) The collision detecting unit 222 transmits, to the currently connected PUF device, an encryption command with designation of the concealed cryptographic key acquired in step S245 and the reference plain text in the original data table 228. The collision detecting unit 222 acquires encrypted text as a response to the encryption command.

(Step S247) The collision detecting unit 222 records, within the existing data table 227, the concealed cryptographic key acquired in step S245 under the existing concealed cryptographic key column and the encrypted text acquired in step S246 under the existing encrypted text column in association with each other.

(Step S248) The collision detecting unit 222 determines that there is no PUF value collision between the currently connected PUF device and the PUF device inspected in the past. The inspection result displaying unit 223 presents a message of "no collision" on the display 211.

The information processing system of the fourth embodiment achieves the same effect as the second embodiment. Further, the information processing system of the fourth embodiment allows change of the cryptographic key used for data protection. In addition, the cryptographic key is concealed using a PUF value difficult to retrieve from outside the PUF device, and is temporarily restored inside the PUF device only when used. This eliminates the need to store the cryptographic key itself outside the PUF device, and the cryptographic key is not output externally from the PUF device even when used. As a result, the risk of leakage of the cryptographic key is reduced. Still further, it is difficult for a PUF device to use a cryptographic key concealed by a different PUF, thus enhancing information security.

(e) Fifth Embodiment

Next described is a fifth embodiment. The following description focuses on differences from the second to fourth embodiments above, and repeated explanations may be omitted. An information processing system according to the fifth embodiment tries, when a PUF value collision has been detected, to avoid the PUF value collision by changing the configuration of a PUF device concerned.

Figure 18:
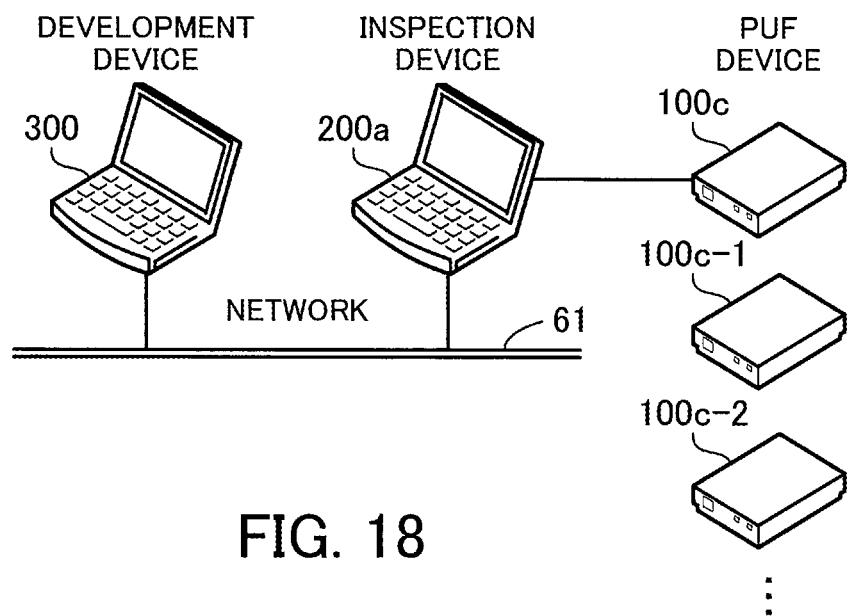
FIG. 18 illustrates an example of an information processing system according to a fifth embodiment.

FIG. 18 illustrates an example of an information processing system according to the fifth embodiment. The information processing system according to the fifth embodiment comprises a plurality of PUF devices including PUF devices 100c, 100c-1, and 100c-2, an inspection device 200a, and a development device 300.

The PUC circuit of each PUF device of the fifth embodiment is implemented using an FPGA. The inspection device 200a is used in place of the inspection device 200 of the second embodiment. The inspection device 200a acquires, from the development device 300, FPGA data indicating a PUF circuit layout and writes the FPGA data into a currently connected PUF device. When detecting that the currently connected PUF device has a PUF value collision with a PUF device inspected in the past, the inspection device 200a tries to avoid the collision by rewriting the FPGA data to thereby change the PUF circuit of the currently connected PUF device. The development device 300 is a computer for providing the FPGA data at the request of the inspection device 200a. The development device 300 is connected to the inspection device 200a via the network 61. The development device 300 may be a client computer or a server computer.

Figure 19:
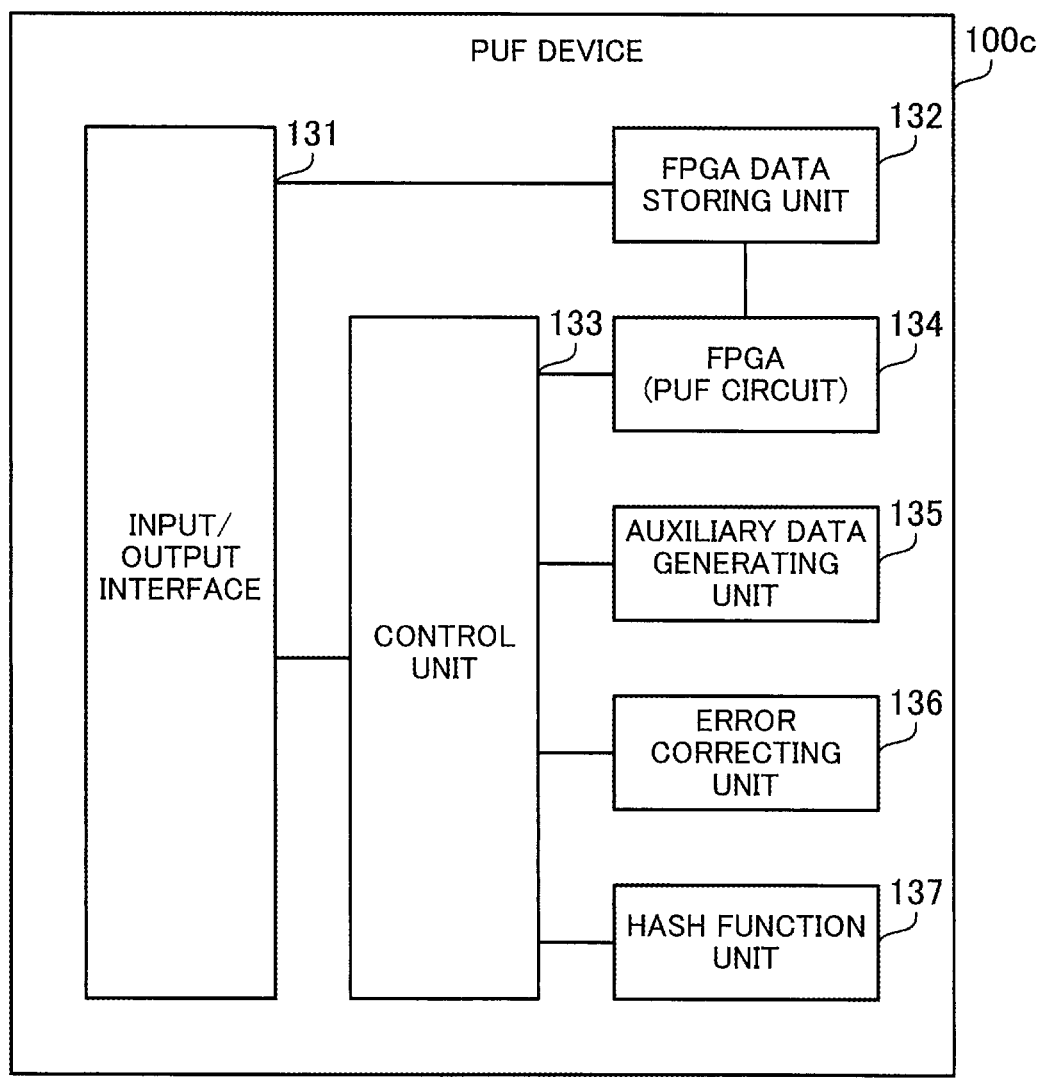
FIG. 19 is a block diagram illustrating an example of a PUF device according to the fifth embodiment.

FIG. 19 is a block diagram illustrating an example of a PUF device according to the fifth embodiment. The PUF device 100c includes an input/output interface 131, an FPGA data storing unit 132, a control unit 133, an FPGA 134, an auxiliary data generating unit 135, an error correcting unit 136, and a hash function unit 137. The entire PUF device 100c including the FPGA 134 may be implemented as an FPGA, or a part of the PUF device 100c other than the FPGA 134 may be implemented as an ASIC.

The input/output interface 131 receives a command from the inspection device 200a and then outputs the result obtained by executing the command to the inspection device 200a. Write commands, auxiliary data acquisition commands, and hash acquisition commands are the types of commands used in the fifth embodiment. A write command is accompanied by FPGA data. In response to the write command, entered FPGA data is written to the FPGA data storing unit 132. Attributes of the auxiliary data acquisition and hash acquisition commands are the same as those described in the second embodiment.

The FPGA data storing unit 132 is a non-volatile storage device to store therein FPGA data. As the FPGA data storing unit 132, a non-volatile semiconductor memory such as a flash memory is used, for example. In response to a write command, FPGA data is written from the input/output interface 131 to the FPGA data storing unit 132.

The control unit 133 corresponds to the control unit 102 of the second embodiment.

The FPGA 134 loads FPGA data from the FPGA data storing unit 132 when the PUF device 100c starts, and forms a logic circuit according to the FPGA data. Herewith, a PUF circuit corresponding to the PUF circuit 103 according to the second embodiment is implemented in the FPGA 134. The FPGA 134 generates a PUF value at the request of the control unit 133 and provides the PUF value. The PUF value to be generated depends on the FPGA data loaded into the FPGA 134 and may undergo a substantial change by changing the FPGA data.

The auxiliary data generating unit 135, the error correcting unit 136, and the hash function unit 137 correspond to the auxiliary data generating unit 104, the error correcting unit 105, and the hash function unit 106, respectively, according to the second embodiment. Note that the PUF device 100c of FIG. 19 has the same cryptographic processing functions as those of the PUF device 100 according to the second embodiment; however, it may have the same cryptographic processing functions as those of the PUF device 100a according to the third embodiment or those of the PUF device 100b according to the fourth embodiment. In that case, the PUF device 100c may include an encrypting unit, a decrypting unit, a key concealing unit, a key restoring unit, and so on.

The inspection device 200a and the development device 300 may be implemented using the same hardware constructions as that of the inspection device 200 according to the second embodiment.

Figure 20:
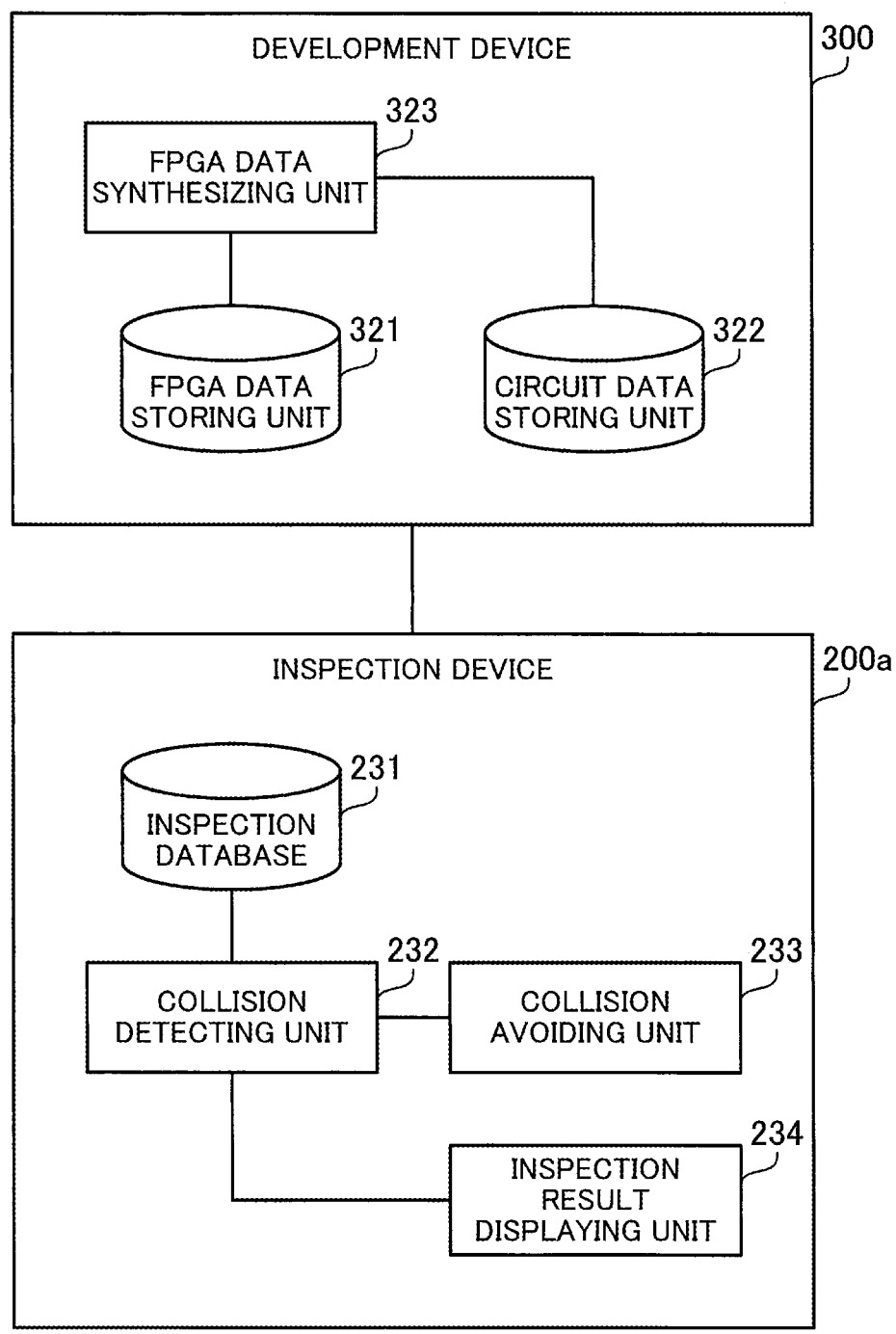
FIG. 20 is a block diagram illustrating an example of functions of devices according to the fifth embodiment.

FIG. 20 is a block diagram illustrating an example of functions of devices according to the fifth embodiment. The inspection device 200a includes an inspection database 231, a collision detecting unit 232, a collision avoiding unit 233, and an inspection result displaying unit 234. The inspection database 231, the collision detecting unit 232, and the inspection result displaying unit 234 correspond to the inspection database 221, the collision detecting unit 222, and the inspection result displaying unit 223, respectively, of the second embodiment. The collision avoiding unit 233 is implemented, for example, using a program executed by a CPU of the inspection device 200a.

The collision avoiding unit 233 tries to avoid a PUF value collision by changing FPGA data. When a PUF value collision is detected by the collision detecting unit 232, the collision avoiding unit 233 requests new FPGA data from the development device 300. The collision avoiding unit 233 transmits, to a currently connected PUF device, a write command with designation of the new FPGA data acquired from the development device 300, to thereby rewrite FPGA data in the PUF device. The collision avoiding unit 233 restarts the currently connected PUF device and causes the collision detecting unit 232 to conduct an inspection again.

The development device 300 includes an FPGA data storing unit 321, a circuit data storing unit 322, and an FPGA data synthesizing unit 323. The FPGA data storing unit 321 and the circuit data storing unit 322 are implemented using a storage area secured, for example, in a RAM or a HDD of the development device 300. The FPGA data synthesizing unit 323 is implemented, for example, using a program executed by a CPU of the development device 300.

The FPGA data storing unit 321 stores FPGA data used to implement a PUF circuit on an FPGA. The FPGA data storing unit 321 has a plurality of patterns of FPGA data, each with a different layout of elements making up a PUF circuit. The circuit data storing unit 322 stores therein circuit data which serves as a source for synthesizing the FPGA data. The circuit data is design data indicating a logic circuit functioning as the PUF circuit and is created in advance by the user of the development device 300. It is possible to synthesize, from the same circuit data, a plurality of patterns of FPGA data, each with a different layout of elements making up a PUF circuit.

The FPGA data synthesizing unit 323 synthesizes in advance a plurality of patterns of FPGA data, each with a different circuit layout, from the circuit data stored in the circuit data storing unit 322. In synthesizing the FPGA data, a random number called "seed" is used. For example, the FPGA data synthesizing unit 323 first selects a seed randomly and controls search for an optimal solution for a circuit layout using the selected seed. A change of the seed changes a circuit layout determined in the end. The FPGA data synthesizing unit 323 synthesizes in advance a plurality of patterns of FPGA data corresponding to a plurality of different seeds and stores them in the FPGA data storing unit 321.

At the request of the inspection device 200a, the FPGA data synthesizing unit 323 selects unused FPGA data from the FPGA data storing unit 321 and provides the selected FPGA data to the inspection device 200a. If the FPGA data storing unit 321 has no unused FPGA data, the FPGA data synthesizing unit 323 synthesizes additional FPGA data using the circuit data stored in the circuit data storing unit 322.

Figure 21:
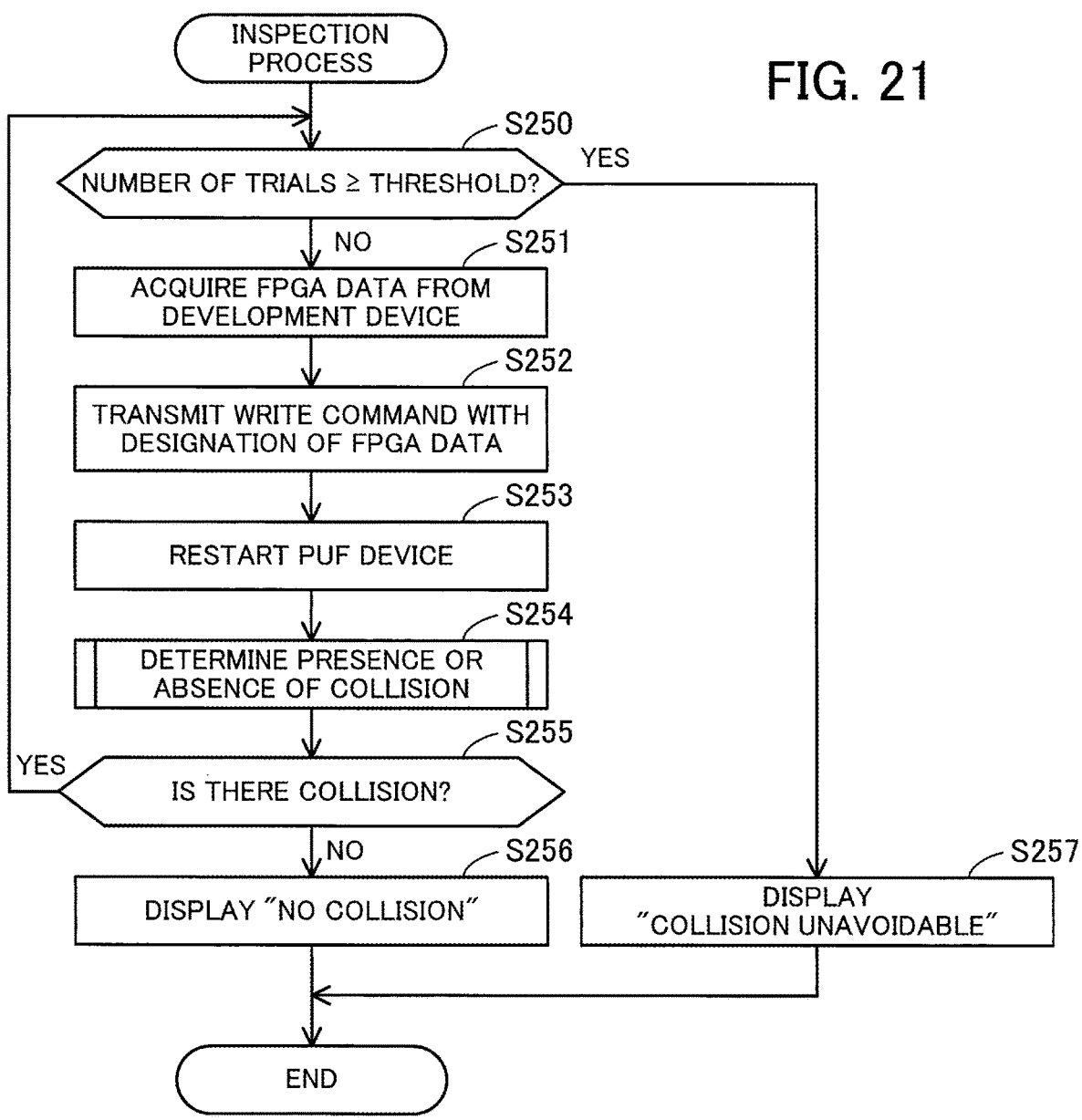
FIG. 21 is a flowchart illustrating a procedure example of an inspection process according to the fifth embodiment.

FIG. 21 is a flowchart illustrating a procedure example of an inspection process according to the fifth embodiment.

(Step S250) The collision detecting unit 232 determines whether the number of trials of the following steps S251 to S255 is more than or equal to a predetermined threshold. If the number of trials is more than or equal to the threshold, the process moves to step S257. If the number of trials is less than the threshold, the process moves to step S251.

(Step S251) The collision avoiding unit 233 acquires FPGA data from the development device 300.

(Step S252) The collision avoiding unit 233 transmits, to a currently connected PUF device, a write command with designation of the FPGA data acquired in step S251. Herewith, the FPGA data is written to the currently connected PUF device.

(Step S253) The collision avoiding unit 233 restarts the currently connected PUF device. This allows the FPGA data written in step S252 to be loaded into an FPGA of the currently connected PUF device to then form a PUF circuit according to the FPGA data.

(Step S254) The collision detecting unit 232 refers to the inspection database 231 to determine whether there is a PUF value collision. For example, the collision detecting unit 232 conducts a collision inspection according to steps S210 to S218 of the second embodiment. Note however that the collision detecting unit 232 may conduct a collision inspection according to steps S220 to S227 of the third embodiment or steps S240 to S248 of the fourth embodiment instead. The collision detecting unit 232 may change the inspection method according to the cryptographic processing functions of the currently connected PUF device.

(Step S255) The collision detecting unit 232 determines whether a PUF value collision was detected in step S254. If a PUF value collision was detected, the process moves to step S250. If no PUF value collision was detected, the process moves to step S256.

(Step S256) The collision detecting unit 232 determines that there is no PUF value collision or a PUF value collision has been resolved. The inspection result displaying unit 234 presents a message of "no collision" on a display.

(Step S257) The collision detecting unit 232 determines that a PUF value collision has not been resolved. The inspection result displaying unit 234 presents a message of "collision unavoidable" on the display.

The information processing system of the fifth embodiment achieves the same effect as the second embodiment. Further, when a PUF value collision is detected, the information processing system of the fifth embodiment changes the configuration of a PUF device concerned to thereby automatically resolve the PUF value collision. As a result, the PUF device is safe to use otherwise it would be abandoned.

(f) Sixth Embodiment

Next described is a sixth embodiment. The following description focuses on differences from the second to fifth embodiments above, and repeated explanations may be omitted. An information processing system according to the sixth embodiment differs from that of the fifth embodiment in the method for changing the configuration of a PUF device. The information processing system according to the sixth embodiment is implemented using the same structure as the information processing system of the fifth embodiment illustrated in FIG. 18. Note however that the information processing system of the sixth embodiment need not include the development device 300. An inspection device according to the sixth embodiment is implemented using the same structure as the inspection device 200a of the fifth embodiment illustrated in FIG. 20. The inspection device of the sixth embodiment is described below using the same reference numerals as those in the fifth embodiment.

Figure 22:
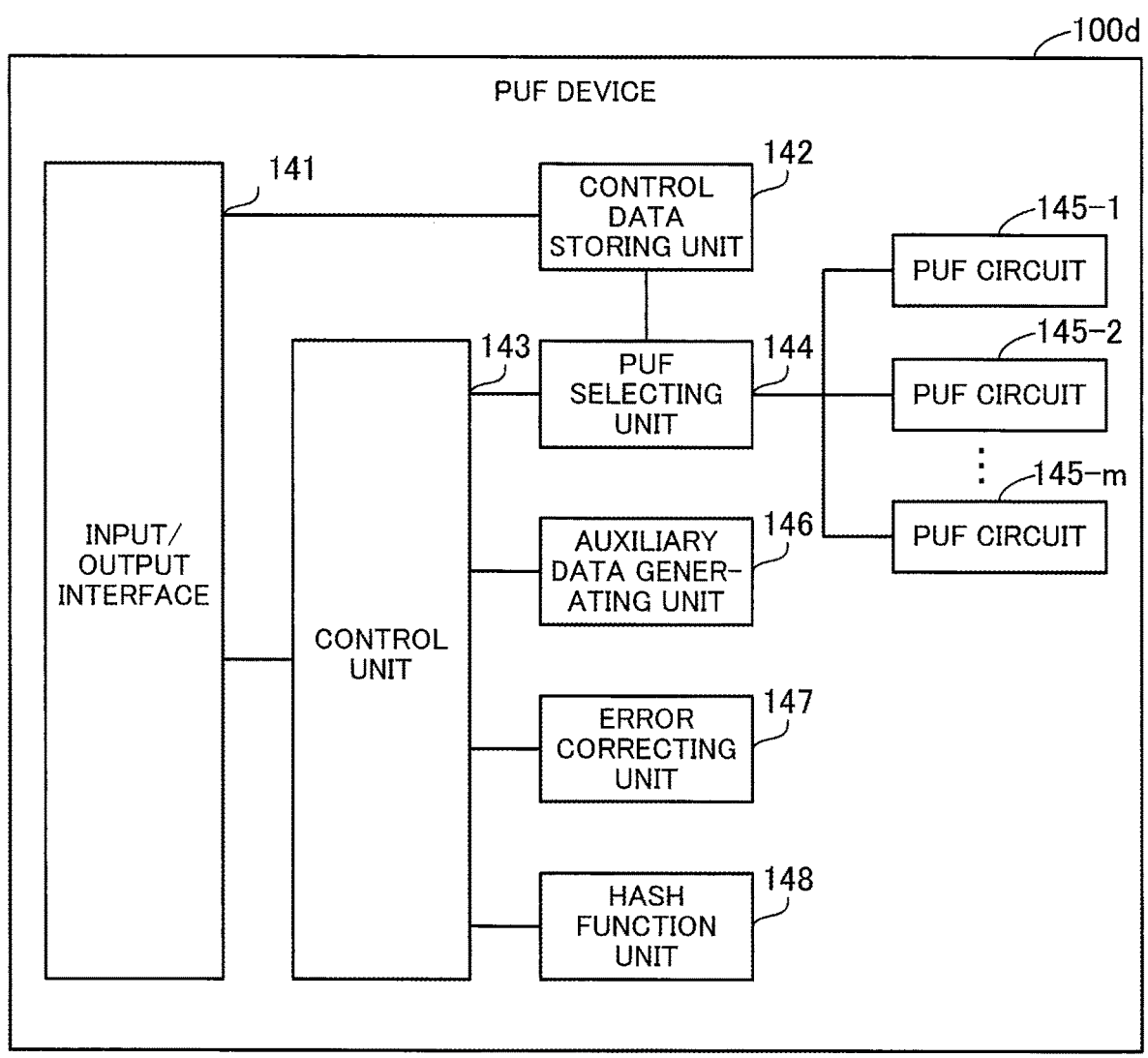
FIG. 22 is a block diagram illustrating an example of a PUF device according to a sixth embodiment.

FIG. 22 is a block diagram illustrating an example of a PUF device according to the sixth embodiment. A PUF device 100d is used in place of the PUF device 100c of the fifth embodiment. The PUF device 100d includes an input/output interface 141, a control data storing unit 142, a control unit 143, a PUF selecting unit 144, "m" PUF circuits (PUF circuits 145-1, 145-2, . . . , 145-m), an auxiliary data generating unit 146, an error correcting unit 147, and a hash function unit 148. A part of or the entire PUF device 100d may be implemented using a programmable device, such as a FPGA, or an ASIC.

The input/output interface 141 receives a command from the inspection device 200a and then outputs the result obtained by executing the command to the inspection device 200a. Read commands, write commands, auxiliary data acquisition commands, and hash acquisition commands are the types of commands used in the sixth embodiment. In response to a read command, control data is read from the control data storing unit 142. A write command is accompanied by control data. In response to the write command, entered control data is written to the control data storing unit 142. Attributes of the auxiliary data acquisition and hash acquisition commands are the same as those described in the fifth embodiment.

The control data storing unit 142 is a non-volatile storage device to store therein control data. As the control data storing unit 142, a non-volatile semiconductor memory such as a flash memory is used, for example. The control data is used to select one PUF circuit from amongst the PUF circuits 145-1, 145-2, . . . , 145-m and referred to by the PUF selecting unit 144. For example, the control data includes a non-negative integer indicating what number of PUF circuit to be used. In response to a write command, the control data is written from the input/output interface 141 to the control data storing unit 142. In response to a read command, the control data is read from the control data storing unit 142 to the input/output interface 141.

The control unit 143 corresponds to the control unit 133 of the fifth embodiment.

The PUF selecting unit 144 loads the control data from the control data storing unit 142 when the PUF device 100d starts, and then selects, according to the control data, one PUF circuit from amongst the PUF circuits 145-1, 145-2, . . . , 145-m. At the request of the control unit 143 for a PUF value, the PUF selecting unit 144 retrieves a PUF value from the selected PUF circuit and outputs the retrieved PUF value to the control unit 143. The PUF value to be output depends on the selected PUF circuit and may undergo a substantial change by changing the control data.

Each of the PUF circuits 145-1, 145-2, . . . , 145-m is an electronic circuit for generating PUF values unique to its hardware using PUF technology. Different PUF circuits are likely to generate PUF values not approximate each other, and the Hamming distance between a PUF value of a PUF circuit and that of a different PUF circuit is likely to exceed a correctable bit count. The same PUF circuit is used unless the control data is rewritten and then the PUF device is restarted.

The auxiliary data generating unit 146, the error correcting unit 147, and the hash function unit 148 correspond to the auxiliary data generating unit 135, the error correcting unit 136, and the hash function unit 137, respectively, of the fifth embodiment. Note that the PUF device 100d of FIG. 22 has the same cryptographic processing functions as those of the PUF device 100 according to the second embodiment; however, it may have the same cryptographic processing functions as those of the PUF device 100a according to the third embodiment or those of the PUF device 100b according to the fourth embodiment. In that case, the PUF device 100d may include an encrypting unit, a decrypting unit, a key concealing unit, a key restoring unit, and so on.

Figure 23:
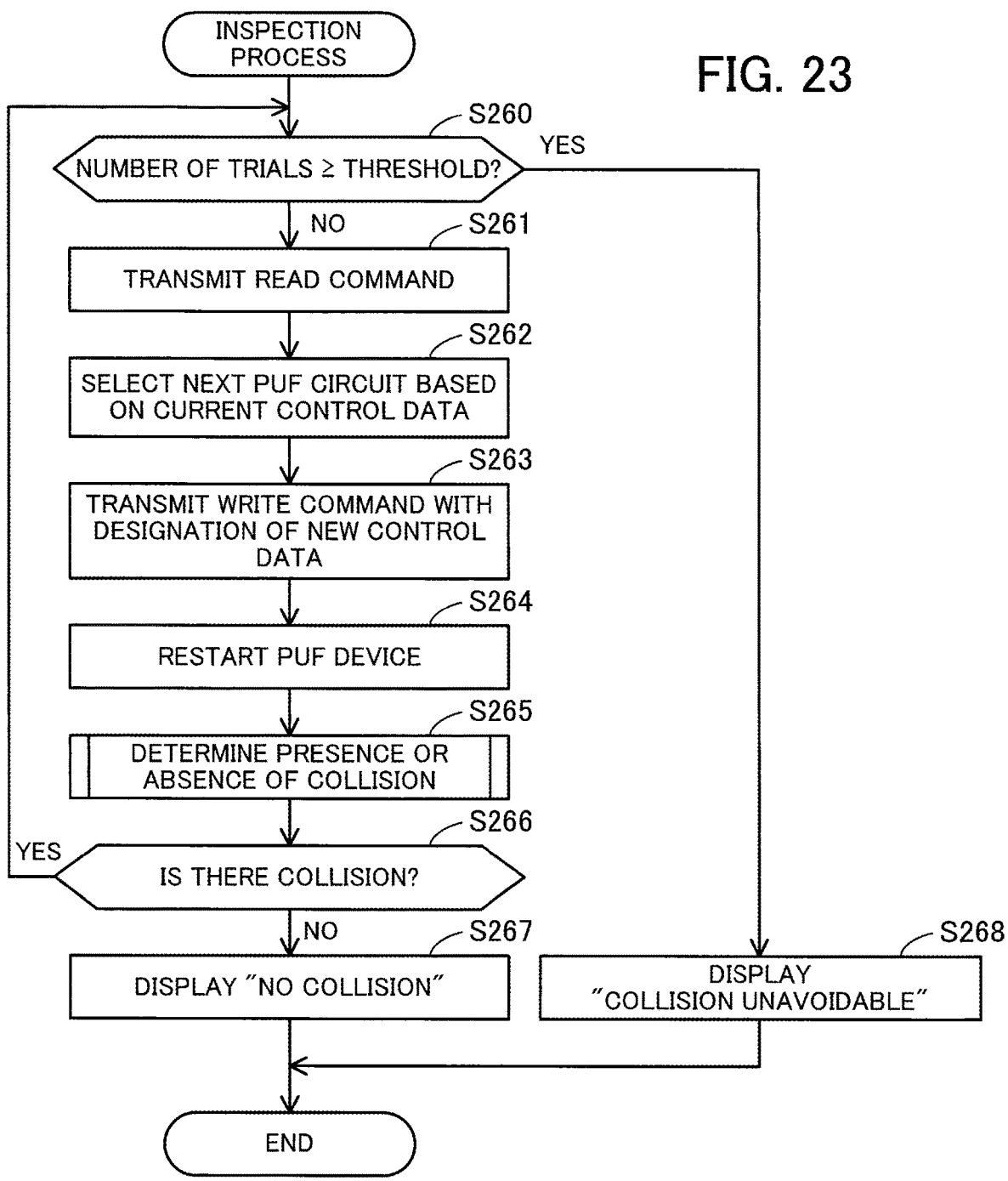
FIG. 23 is a flowchart illustrating a procedure example of an inspection process according to the sixth embodiment.

FIG. 23 is a flowchart illustrating a procedure example of an inspection process according to the sixth embodiment.

(Step S260) The collision detecting unit 232 determines whether the number of trials of the following steps S261 to S266 is more than or equal to a predetermined threshold. If the number of trials is more than or equal to the threshold, the process moves to step S268. If the number of trials is less than the threshold, the process moves to step S261.

(Step S261) The collision avoiding unit 233 transmits a read command to a currently connected PUF device and acquires control data stored at the moment in the currently connected PUF device.

(Step S262) The collision avoiding unit 233 selects the next PUF circuit based on the current control data acquired in step S261 and generates new control data indicating the selected next PUF circuit. For example, the collision avoiding unit 233 selects, as the next PUF circuit, a PUF circuit whose number is greater than that of the PUF circuit indicated by the current control data by 1. Note however that the collision avoiding unit 233 selects the first PUF circuit for the first inspection.

(Step S263) The collision avoiding unit 233 transmits, to the currently connected PUF device, a write command with designation of the new control data generated in step S262. Herewith, the new control data is written to the currently connected PUF device.

(Step S264) The collision avoiding unit 233 restarts the currently connected PUF device. This allows the control data written in step S263 to be loaded into the PUF selecting unit of the currently connected PUF device to then select a PUF circuit according to the control data.

(Step S265) The collision detecting unit 232 refers to the inspection database 231 to determine whether there is a PUF value collision. For example, the collision detecting unit 232 conducts a collision inspection according to steps S210 to S218 of the second embodiment. Note however that the collision detecting unit 232 may conduct a collision inspection according to steps S220 to S227 of the third embodiment or steps S240 to S248 of the fourth embodiment instead. The collision detecting unit 232 may change the inspection method according to the cryptographic processing functions of the currently connected PUF device.

(Step S266) The collision detecting unit 232 determines whether a PUF value collision was detected in step S265. If a PUF value collision was detected, the process moves to step S260. If no PUF value collision was detected, the process moves to step S267.

(Step S267) The collision detecting unit 232 determines that there is no PUF value collision or a PUF value collision has been resolved. The inspection result displaying unit 234 presents a message of "no collision" on a display.

(Step S268) The collision detecting unit 232 determines that a PUF value collision has not been resolved. The inspection result displaying unit 234 presents a message of "collision unavoidable" on the display.

The information processing system of the sixth embodiment achieves the same effect as the fifth embodiment. Further, the information processing system of the sixth embodiment uses a programmable device to allow avoidance of a PUF value collision even when a PUF circuit is not implemented.

(g) Seventh Embodiment

Next described is a seventh embodiment. The following description focuses on differences from the second to sixth embodiments above, and repeated explanations may be omitted. According to the seventh embodiment, a manufacturer producing PUF devices inspects each PUF device before shipment, and a user, a vendor, or the like who has obtained the PUF device additionally inspects the PUF device for confirmation. In order to support the additional inspection, an information processing system according to the seventh embodiment makes publicly available inspection data generated by the manufacturer in the course of the inspection.

Figure 24:
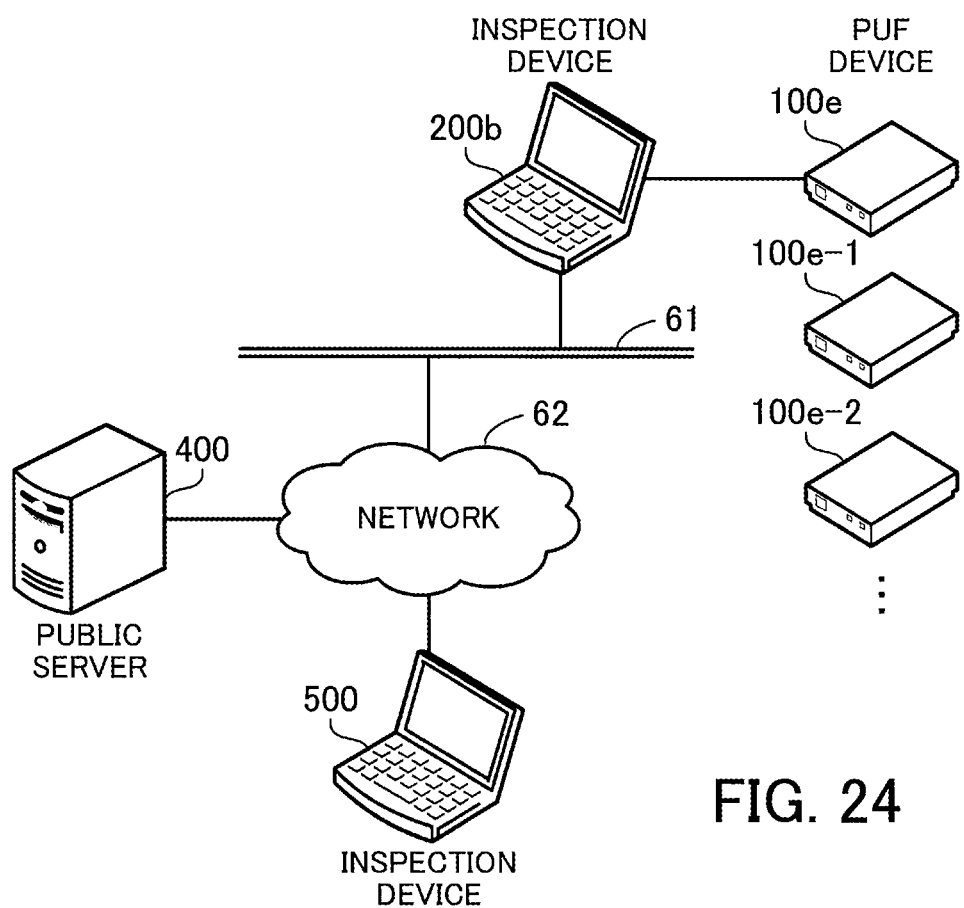
FIG. 24 illustrates an example of an information processing system according to a seventh embodiment.

FIG. 24 illustrates an example of an information processing system according to the seventh embodiment. The information processing system according to the seventh embodiment comprises a plurality of PUF devices including PUF devices 100e, 100e-1, and 100e-2, inspection devices 200b and 500, and a public server 400. The public server 400 and the inspection device 500 are individually connected to a network 62. The network 62 is a broad area network such as the Internet.

The public server 400 is a server computer for making publicly available, as confirmation data, inspection data generated by the inspection device 200b in the course of inspection. The confirmation data is uploaded to the public server 400 from the inspection device 200b via the networks 61 and 62. The inspection device 500 is a computer used, for example, by the user or vendor who has obtained a PUF device. The PUF device is connected to the inspection device 500. The inspection device 500 acquires the confirmation data from the public server 400 via the network 62 and confirms, using the confirmation data, whether there is no PUF value collision between the obtained PUF device and other PUF devices not owned by the user or vendor.

Figure 25:
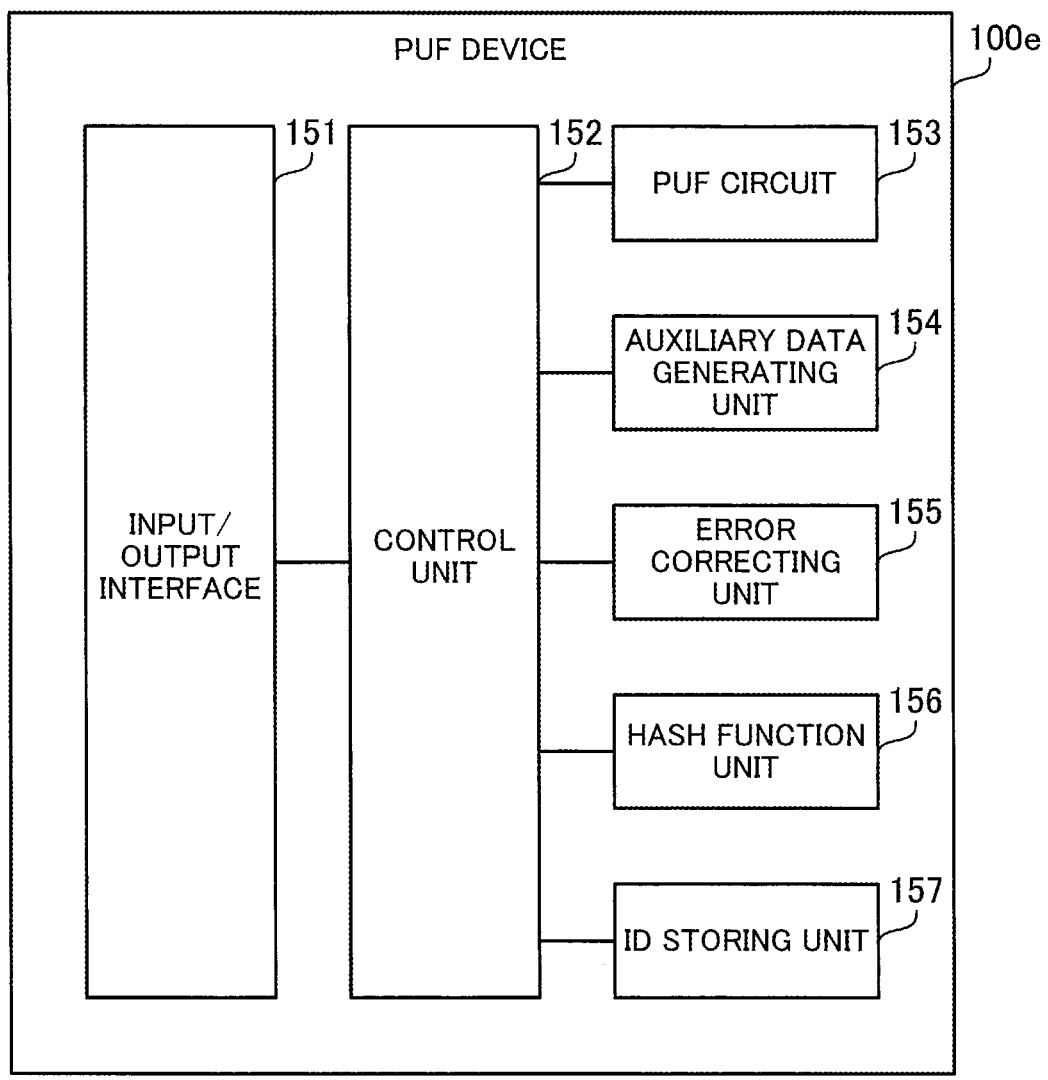
FIG. 25 is a block diagram illustrating an example of a PUF device according to the seventh embodiment.

FIG. 25 is a block diagram illustrating an example of a PUF device according to the seventh embodiment. The PUF device 100e includes an input/output interface 151, a control unit 152, a PUF circuit 153, an auxiliary data generating unit 154, an error correcting unit 155, a hash function unit 156, and an identifier (ID) storing unit 157. Other PUF devices including the PUF devices 100e-1 and 100e-2 may be implemented using the same hardware constructions as that of the PUF devices 100e.

The input/output interface 151 receives a command from the inspection device 200b and then outputs the result obtained by executing the command to the inspection device 200b. Auxiliary data acquisition commands, hash acquisition commands, and ID read commands are the types of commands used in the seventh embodiment. Attributes of the auxiliary data acquisition and hash acquisition commands are the same as those described in the second embodiment. In response to an ID read command, a PUF device ID which is an identifier for identifying the PUF device 100e is output.

The control unit 152 performs cryptographic processing using the PUF circuit 153, the auxiliary data generating unit 154, the error correcting unit 155, and the hash function unit 156 when obtaining an auxiliary data acquisition command or a hash acquisition command from the input/output interface 151. In addition, when obtaining an ID read acquisition command from the input/output interface 151, the control unit 152 reads the PUF device ID from the ID storing unit 157 and outputs it to the input/output interface 151.

The PUF circuit 153, the auxiliary data generating unit 154, the error correcting unit 155, and the hash function unit 156 correspond to the PUF circuit 103, the auxiliary data generating unit 104, the error correcting unit 105, and the hash function unit 106, respectively, of the second embodiment.

Note that the PUF device 100e of FIG. 25 has the same cryptographic processing functions as those of the PUF device 100 according to the second embodiment; however, it may have the same cryptographic processing functions as those of the PUF device 100a according to the third embodiment or those of the PUF device 100b according to the fourth embodiment. In that case, the PUF device 100e may include an encrypting unit, a decrypting unit, a key concealing unit, a key restoring unit, and so on.

The ID storing unit 157 is a non-volatile storage device to store therein a PUF device ID for identifying the PUF device 100e. As the ID storing unit 157, a non-volatile semiconductor memory such as a read only memory (ROM) and a flash memory is used, for example. The ID storing unit 157 stores in advance the PUF device ID which does not duplicate any of those of other PUF devices.

The inspection devices 200b and 500 and the public server 400 may be implemented using the same hardware constructions as that of the inspection device 200 of the second embodiment.

Figure 26:
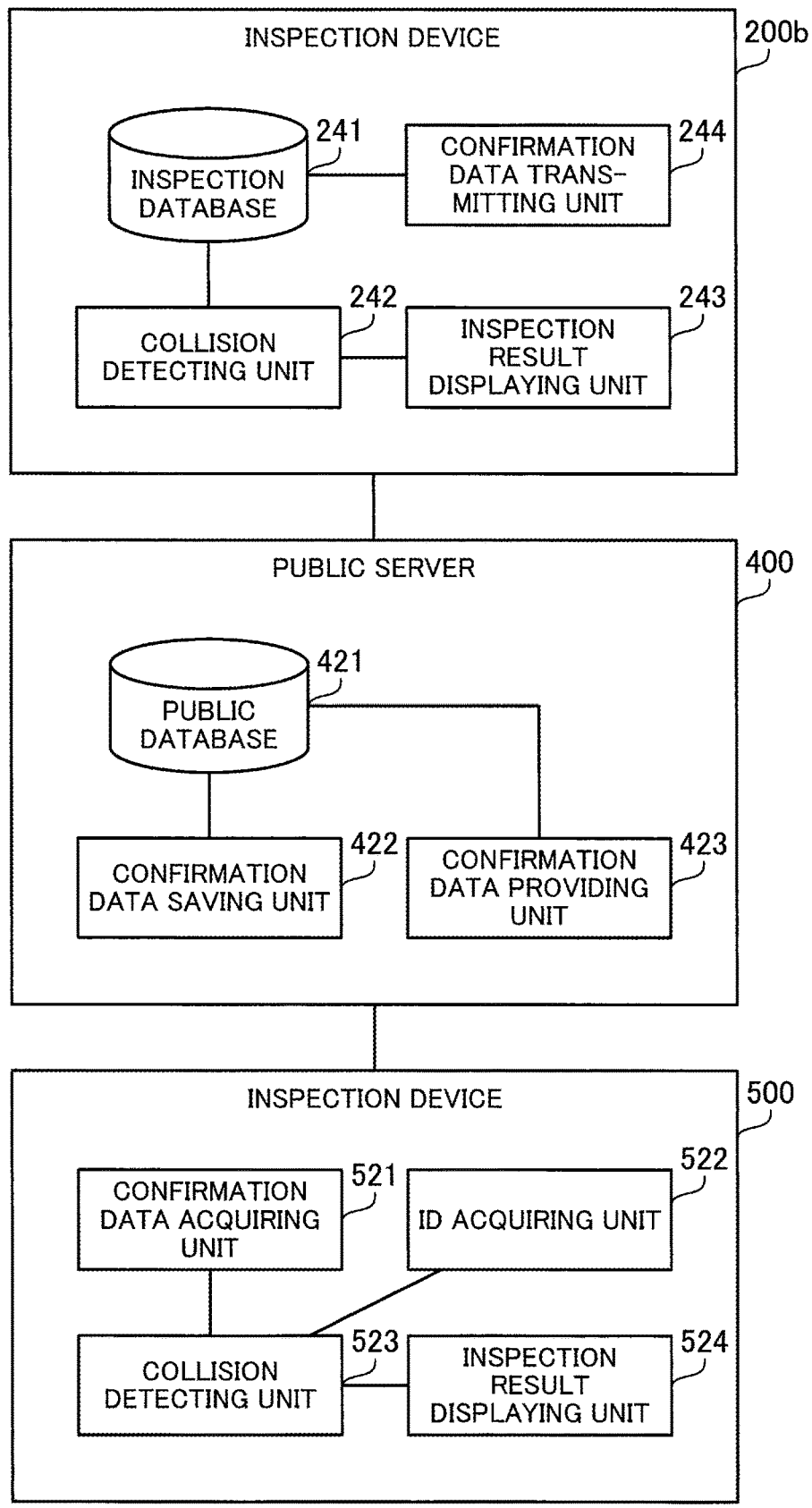
FIG. 26 is a block diagram illustrating an example of functions of devices according to the seventh embodiment.

FIG. 26 is a block diagram illustrating an example of functions of devices according to the seventh embodiment. The inspection device 200b includes an inspection database 241, a collision detecting unit 242, an inspection result displaying unit 243, and a confirmation data transmitting unit 244. The inspection database 241, the collision detecting unit 242, and the inspection result displaying unit 243 correspond to the inspection database 221, the collision detecting unit 222, and the inspection result displaying unit 223, respectively, of the second embodiment. The confirmation data transmitting unit 244 is implemented, for example, using a program executed by a CPU of the inspection device 200b.

The inspection database 241 stores an existing data table similar to the existing data table 224 of the second embodiment. Note however that, in the seventh embodiment, each record of the existing data table further includes a PUF device ID. Alternatively, the inspection database 241 may store an existing data table similar to the existing data table 225 of the third embodiment or the existing data table 227 of the fourth embodiment. In that case also, each record of the existing data table further includes a PUF device ID. In addition, the inspection database 241 may store an original data table similar to the original data table 226 of the third embodiment or the original data table 228 of the fourth embodiment.

The collision detecting unit 242 performs a collision inspection in a similar manner to that performed by the collision detecting unit 222 of the second embodiment. Note however that, when having determined that a currently connected PUF device does not have a collision, the collision detecting unit 242 acquires, from the currently connected PUF device, the PUF device ID in addition to the existing auxiliary data and the existing hash and registers it in the existing data table stored in the inspection database 241. Note that the collision detecting unit 242 may perform a collision inspection in a similar manner as that described in the third or fourth embodiment. In that case also, the collision detecting unit 242 is configured to acquire the PUF device ID from the currently connected PUF device and register it in the existing data table.

The inspection result displaying unit 243 presents the inspection result of the collision detecting unit 242 on a display.

The confirmation data transmitting unit 244 transmits, as for PUF devices having already undergone an inspection, the existing data table stored in the inspection database 241 to the public server 400 as confirmation data. In the case where an original data table is stored in the inspection database 241, the confirmation data transmitting unit 244 includes the original data table in the confirmation data to be then transmitted to the public server 400.

The public server 400 includes a public database 421, a confirmation data saving unit 422, and a confirmation data providing unit 423. The public database 421 is implemented using a storage area secured, for example, in a RAM or a HDD. The confirmation data saving unit 422 and the confirmation data providing unit 423 are implemented, for example, using a program.

The public database 421 stores therein confirmation data uploaded from the inspection device 200b. The confirmation data includes an existing data table. In the case where an original data table is used for a collision inspection, the confirmation data also includes the original data table. The confirmation data saving unit 422 receives the confirmation data from the inspection device 200b and then stores it in the public database 421. At the request of the inspection device 500, the confirmation data providing unit 423 reads the confirmation data from the public database 421 and transmits it to the inspection device 500.

The inspection device 500 includes a confirmation data acquiring unit 521, an ID acquiring unit 522, a collision detecting unit 523, and an inspection result displaying unit 524. The confirmation data acquiring unit 521, the ID acquiring unit 522, the collision detecting unit 523, and the inspection result displaying unit 524 are implemented, for example, using a program.

The confirmation data acquiring unit 521 acquires the confirmation data from the public server 400 when a PUF device is connected to the inspection device 500. The ID acquiring unit 522 transmits an ID read command to the currently connected PUF device to thereby acquire the PUF device ID of the currently connected PUF device.

The collision detecting unit 523 inspects the currently connected PUF device using the confirmation data acquired by the confirmation data acquiring unit 521 in a similar manner to that performed by the collision detecting unit 242 of the inspection device 200b. In the inspection performed by the collision detecting unit 523, it is confirmed whether the PUF value of the currently connected PUF device does not collision with PUF values of other PUF devices shipped by the manufacturer. On this occasion, because the confirmation data includes a record corresponding to the currently connected PUF device, the collision detecting unit 523 conducts the inspection in disregard of the record including the PUF device ID acquired by the ID acquiring unit 522. The inspection result displaying unit 524 presents the inspection result obtained by the collision detecting unit 523 on a display.

FIG. 27 illustrates an example of a public table according to the seventh embodiment. The public database 421 stores an existing data table 424. The existing data table 424 includes items of PUF device ID, existing auxiliary data, and existing hash. Each field under the item "PUF device ID" contains a PUF device ID of an already inspected PUF device. Each field under the item "existing auxiliary data" contains auxiliary data generated by the corresponding already inspected PUF device. Each field under the item "existing hash" contains a hash generated by the corresponding already inspected PUF device.

Note that, in the case of adopting an inspection method similar to that described in the third embodiment, the public database 421 may store an existing data table including items of PUF device ID and existing encrypted text and an original data table including an item of reference plain text. Alternatively, in the case of adopting an inspection method similar to that described in the fourth embodiment, the public database 421 may store an existing data table including items of PUF device ID, existing concealed cryptographic key, and existing encrypted text and an original data table including items of reference plain text and cryptographic key.

Figure 28:
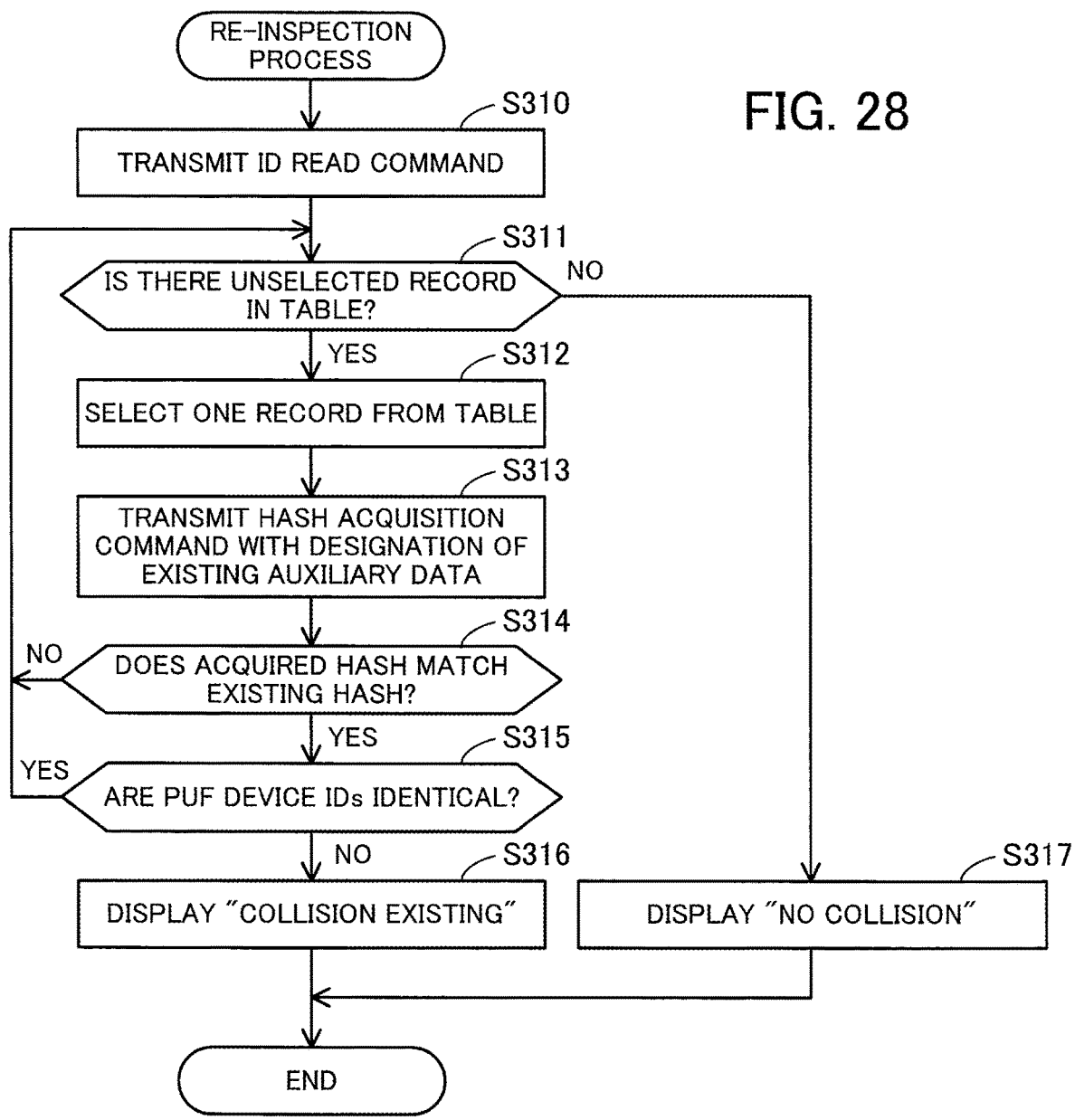
FIG. 28 is a flowchart illustrating a procedure example of a re-inspection process according to the seventh embodiment.

FIG. 28 is a flowchart illustrating a procedure example of a re-inspection process according to the seventh embodiment.

(Step S310) The ID acquiring unit 522 transmits an ID read command to a currently connected PUF device and acquires a PUF device ID from the currently connected PUF device.

(Step S311) The collision detecting unit 523 determines whether there are one or more unselected records in the existing data table 424. If there are one or more unselected records, the process moves to step S312. On the other hand, if all the records have been selected, the process moves to step S317.

(Step S312) The collision detecting unit 523 selects one record from the existing data table 424. The selected record includes a PUF device ID, existing auxiliary data, and an existing hash.

(Step S313) The collision detecting unit 523 transmits, to the currently connected PUF device, a hash acquisition command with designation of the existing auxiliary data obtained in step S312. The collision detecting unit 523 acquires a hash as a response to the hash acquisition command.

(Step S314) The collision detecting unit 523 determines whether the hash acquired in step S313 matches the existing hash of step S312. If the acquired hash matches the existing hash, the process moves to step S315. On the other hand, if the two do not match, then the process moves to step S311.

(Step S315) The collision detecting unit 523 determines whether the PUF device ID of the step S312 is the same as the PUF device ID read in step S310. If the PUF devices IDs are identical, the process moves to step S311. If not, the process moves to step S316.

(Step S316) The collision detecting unit 523 determines that a PUF value collision exists between the currently connected PUF device and a different PUF device already shipped. The inspection result displaying unit 524 presents a message of "collision existing" on a display of the inspection device 500.

(Step S317) The collision detecting unit 523 determines that there is no PUF value collision between the currently connected PUF device and the different PUF device already shipped. The inspection result displaying unit 524 presents a message of "no collision" on the display of the inspection device 500.

Note that the collision detecting unit 523 may perform a procedure similar to steps S220 to S223 of the third embodiment, in place of steps S311 to S314 above. Alternatively, the collision detecting unit 523 may perform a procedure similar to steps S240 to S243 of the fourth embodiment, in place of steps S311 to S314 above. In addition, it is possible to incorporate the seventh embodiment with the fifth embodiment or the sixth embodiment above.

The information processing system of the seventh embodiment achieves the same effect as the second embodiment. In addition, the information processing system according to the seventh embodiment allows a person other than the manufacturer of the PUF devices to confirm that there is no PUF value collision and therefore use his/her PUF device with ease.

According to one aspect, it is possible to detect a PUF value collision.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A collision detection system comprising:
    an inspection target apparatus configured to include:
        a first generating circuit configured to generate a first value depending on hardware, and
        a first processing unit configured to execute a first process including outputting encoding result data by generating, in response to a first request, the encoding result data using the generated first value and an error-correction encoding method and outputting decoding result data by generating, in response to a second request including designation of encoding result data, the decoding result data using the designated encoding result data, the generated first value, and an error-correction decoding method; and
    an inspection apparatus configured to include:
        a storing unit configured to store first encoding result data generated by a different inspection target apparatus and reference data, the different inspection target apparatus including a second generating circuit configured to generate a second value depending on hardware, and
        a second processing unit configured to execute a second process including indicating designation of the first encoding result data to the inspection target apparatus, receiving first decoding result data corresponding to the first encoding result data from the inspection target apparatus, determining whether the first decoding result data matches the reference data in comparison with each other, and outputting an error message indicating collision of values between the first generating circuit and the second generating circuit when the first decoding result data matches the reference data.

2. The collision detection system according to claim 1, wherein:
    the second process further includes causing, when the first decoding result data matches the reference data, the inspection target apparatus to change configuration of the first generating circuit, receiving changed first decoding result data corresponding to the first encoding result data from the inspection target apparatus, and comparing the changed first decoding result data to the reference data.

3. The collision detection system according to claim 2, wherein:
    the first generating circuit includes a programmable device, and
    the causing the inspection target apparatus to change configuration includes changing circuit information to be loaded into the programmable device.

4. The collision detection system according to claim 2, wherein:
    the first generating circuit of the inspection target apparatus is provided in plurality, and
    the causing the inspection target apparatus to change configuration includes selecting a first generating circuit to be used from amongst the plurality of first generating circuits.

5. The collision detection system according to claim 1, wherein:
    the outputting decoding result data includes calculating, by the first processing unit, a corrected first value obtained by correcting the generated first value using the designated encoding result data and the error-correction decoding method and outputting the decoding result data including a hash of the corrected first value,
    the reference data includes a second hash generated by the different inspection target apparatus, and
    the determining includes comparing, by the second processing unit, a first hash included in the first decoding result data to the second hash.

6. The collision detection system according to claim 1, wherein:
    the first request includes designation of plain text,
    the outputting encoding result data includes generating, by the first processing unit, encrypted text corresponding to the designated plain text using the generated first value and the error-correction encoding method and outputting the encoding result data including the generated encrypted text,
    the outputting decoding result data includes generating, by the first processing unit, plain text corresponding to encrypted text included in the designated encoding result data using the generated first value and the error-correction decoding method and outputting the decoding result data including the generated plain text,
    the first encoding result data includes first encrypted text generated by the different inspection target apparatus, and the reference data includes second plain text, and
    the determining includes comparing, by the second processing unit, first plain text corresponding to the first encrypted text and included in the first decoding result data to the second plain text.

7. The collision detection system according to claim 1, wherein:
    the first request includes designation of a cryptographic key,
    the outputting encoding result data includes generating, by the first processing unit, a concealed cryptographic key corresponding to the designated cryptographic key using the generated first value and the error-correction encoding method and outputting the encoding result data including the generated concealed cryptographic key, the second request further includes designation of encrypted text, the outputting decoding result data includes generating, by the first processing unit, a cryptographic key corresponding to a concealed cryptographic key included in the designated encoding result data using the generated first value and the error-correction decoding method, generating plain text by decrypting the designated encrypted text using the generated cryptographic key, and outputting the decoding result data including the generated plain text, the first encoding result data includes a first concealed cryptographic key generated by the different inspection target apparatus, the reference data includes second plain text, and the storing unit further stores first encrypted text, and the determining includes comparing, by the second processing unit, first plain text corresponding to the first concealed cryptographic key and the first encrypted text and included in the first decoding result data to the second plain text.

8. The collision detection system according to claim 1, wherein:

the second process further includes receiving, when the first decoding result data does not match the reference data, second encoding result data generated by the inspection target apparatus from the inspection target apparatus and store the second encoding result data in the storing unit.

9. A collision detection method comprising:

generating, by a first inspection target apparatus, encoding result data using a first value depending on hardware of a first generating circuit of the first inspection target apparatus and an error-correction encoding method and transmitting the encoding result data to an inspection apparatus;

transmitting, by the inspection apparatus, the encoding result data to a second inspection target apparatus;

generating, by the second inspection target apparatus, decoding result data using the encoding result data, a second value depending on hardware of a second generating circuit of the second inspection target apparatus, and an error-correction decoding method and transmitting the decoding result data to the inspection apparatus; and determining, by the inspection apparatus, whether the decoding result data matches reference data stored in the inspection apparatus in comparison with each other, and outputting an error message indicating collision of values between the first generating circuit and the second generating circuit when the decoding result data matches the reference data.

\* \* \* \* \*